(12) United States Patent
Imamura et al.

(10) Patent No.: US 11,084,084 B2
(45) Date of Patent: Aug. 10, 2021

(54) ELECTROMAGNETIC FORMING DEVICE AND ELECTROMAGNETIC FORMING METHOD FOR ALUMINUM TUBE MEMBER

(71) Applicants: Kobe Steel, Ltd., Kobe (JP); TOYOTA JIDOSHA KABUSHIKI KAISHA, Toyota (JP)

(72) Inventors: Yoshihaya Imamura, Fujisawa (JP); Takayoshi Sugisaki, Fujisawa (JP); Chieko Imai, Fujisawa (JP)

(73) Assignees: Kobe Steel, Ltd., Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/628,903

(22) PCT Filed: Jul. 12, 2018

(86) PCT No.: PCT/JP2018/026404
§ 371 (c)(1),
(2) Date: Jan. 6, 2020

(87) PCT Pub. No.: WO2019/013307
PCT Pub. Date: Jan. 17, 2019

(65) Prior Publication Data
US 2020/0139420 A1 May 7, 2020

(30) Foreign Application Priority Data

Jul. 12, 2017 (JP) .............................. JP2017-136635

(51) Int. Cl.
*B21D 39/08* (2006.01)
*B21D 26/14* (2006.01)
(Continued)

(52) U.S. Cl.
CPC ............. *B21D 39/08* (2013.01); *B21D 26/14* (2013.01); *B21D 39/04* (2013.01); *B21D 39/06* (2013.01);
(Continued)

(58) Field of Classification Search
CPC ........ B21D 26/14; B21D 39/04; B21D 39/06; B21D 39/08; Y10T 29/49803; Y10T 403/4966; B23K 20/06
See application file for complete search history.

(56) References Cited

U.S. PATENT DOCUMENTS

| 4,750,250 A * | 6/1988 | Maus ................... B21D 39/203 |
| | | 29/888.1 |
| 6,921,013 B1 * | 7/2005 | Kichline, Jr. .......... B23K 20/06 |
| | | 228/115 |
| 2006/0231587 A1 | 10/2006 | Kiehl et al. |

FOREIGN PATENT DOCUMENTS

| CN | 1829583 A | 9/2006 |
| CN | 201012377 Y | 1/2008 |

(Continued)

OTHER PUBLICATIONS

International Search Report dated Oct. 16, 2018 in PCT/JP2018/026404 filed on Jul. 12, 2018, 1 page.

*Primary Examiner* — Jermie E Cozart
(74) *Attorney, Agent, or Firm* — Oblon, McClelland, Maier & Neustadt, L.L.P.

(57) ABSTRACT

An electromagnetic forming device for an aluminum tube member, the electromagnetic forming device including: a jig plate in which a support member that has a through hole has been fixed to a substrate; and a tube insertion mechanism that inserts a tube member into the through hole in the support member. The electromagnetic forming device also includes: a coil unit that has an electromagnetic-forming coil part; a coil movement mechanism that supports the coil unit;

(Continued)

a current supply part that supplies current for electromagnetic forming to the electromagnetic-forming coil part; and a jig plate transport mechanism that transports the jig plate from a tube insertion stage ST1 to a tube expansion stage ST2.

20 Claims, 26 Drawing Sheets

(51) Int. Cl.
    *B21D 39/06*     (2006.01)
    *B23K 20/06*     (2006.01)
    *B21D 39/04*     (2006.01)

(52) U.S. Cl.
    CPC ......... *B23K 20/06* (2013.01); *Y10T 29/49803* (2015.01); *Y10T 403/4966* (2015.01)

(56) References Cited

FOREIGN PATENT DOCUMENTS

| | | |
|---|---|---|
| CN | 103894472 A | 7/2014 |
| CN | 103978086 A | 8/2014 |
| JP | 2006-264469 A | 10/2006 |

\* cited by examiner

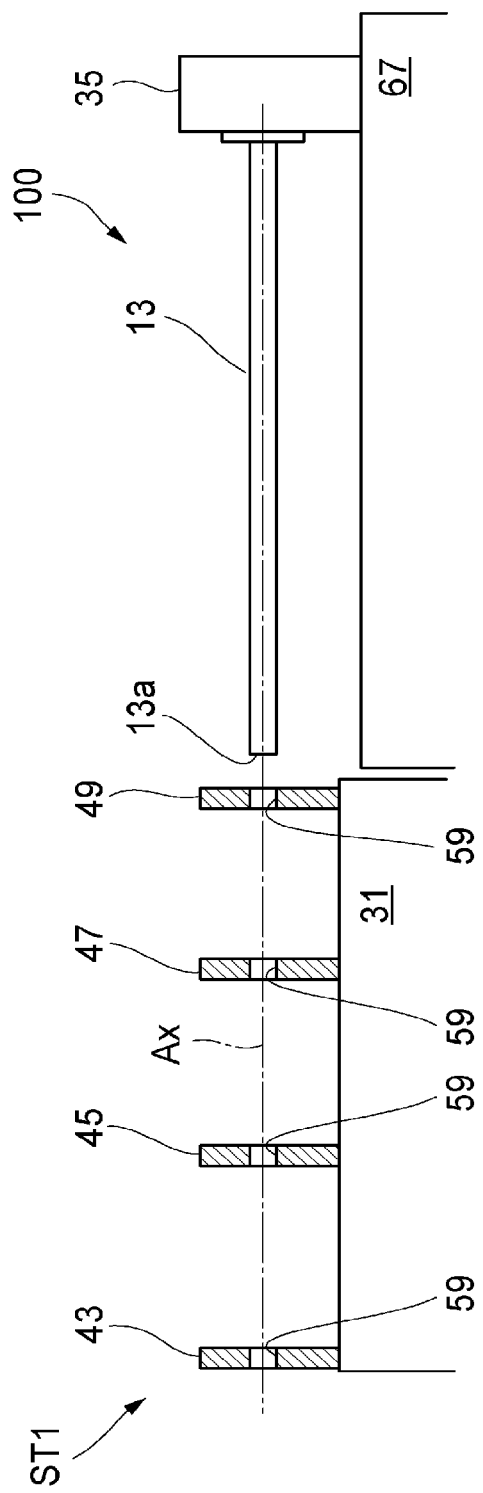

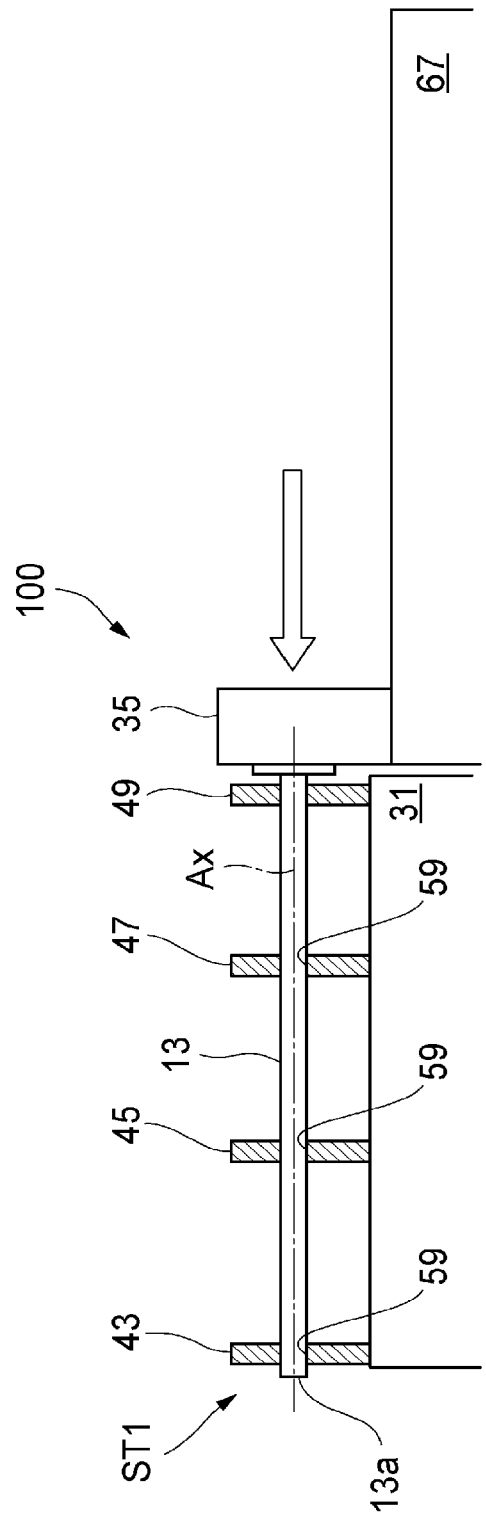

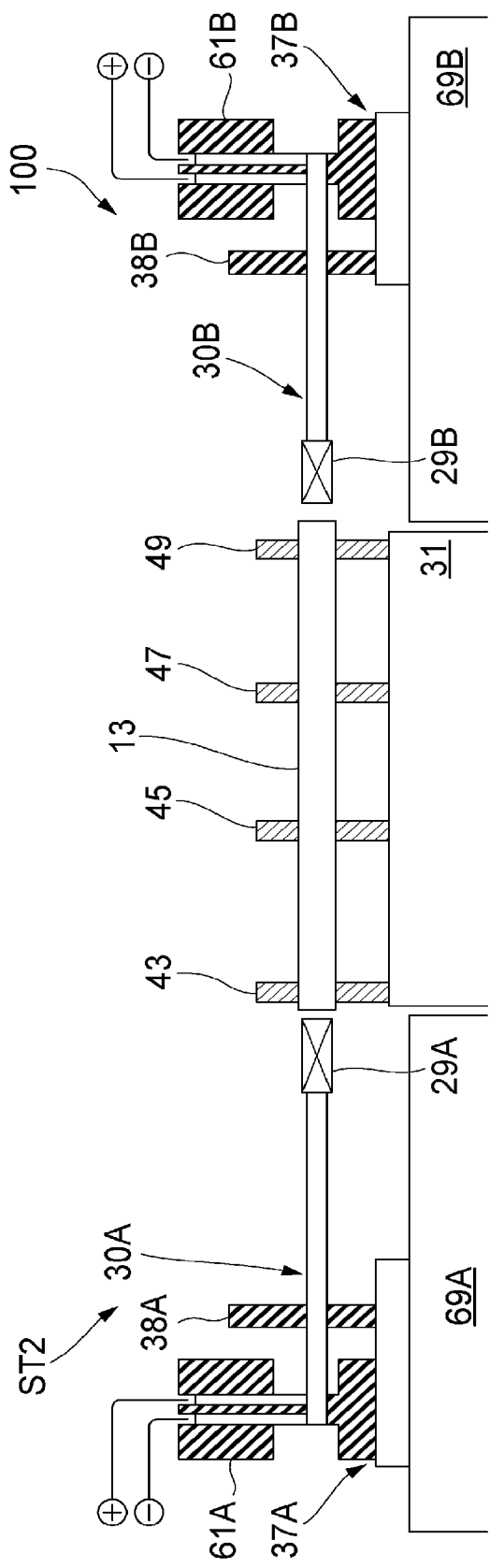

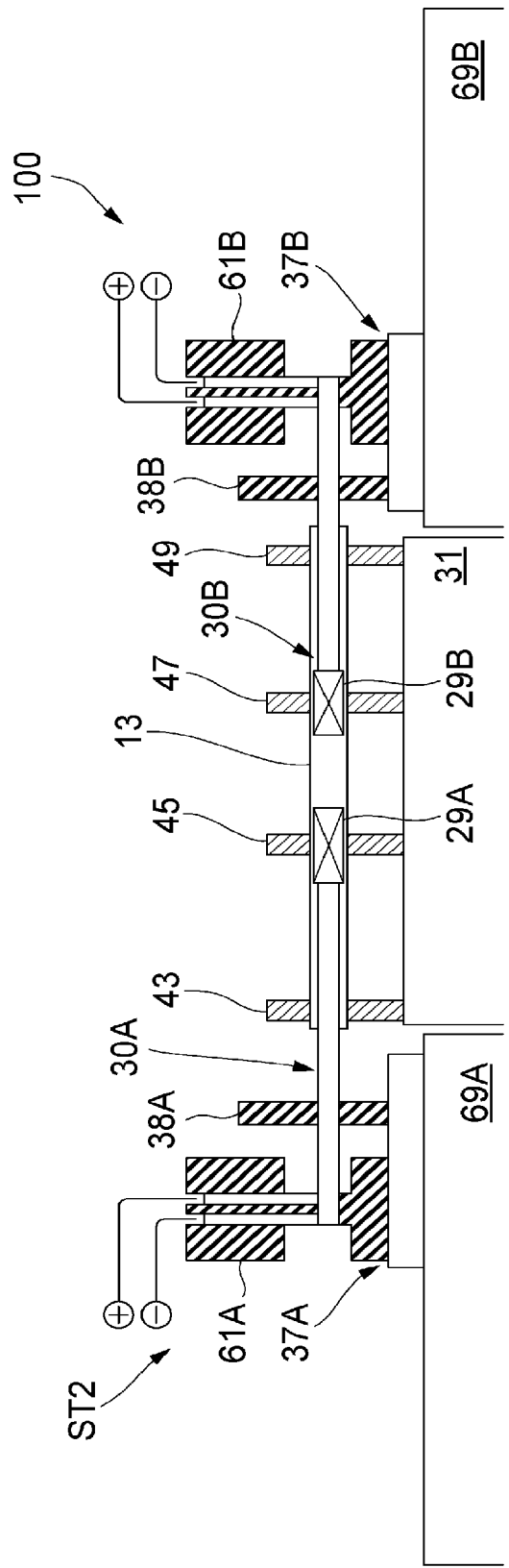

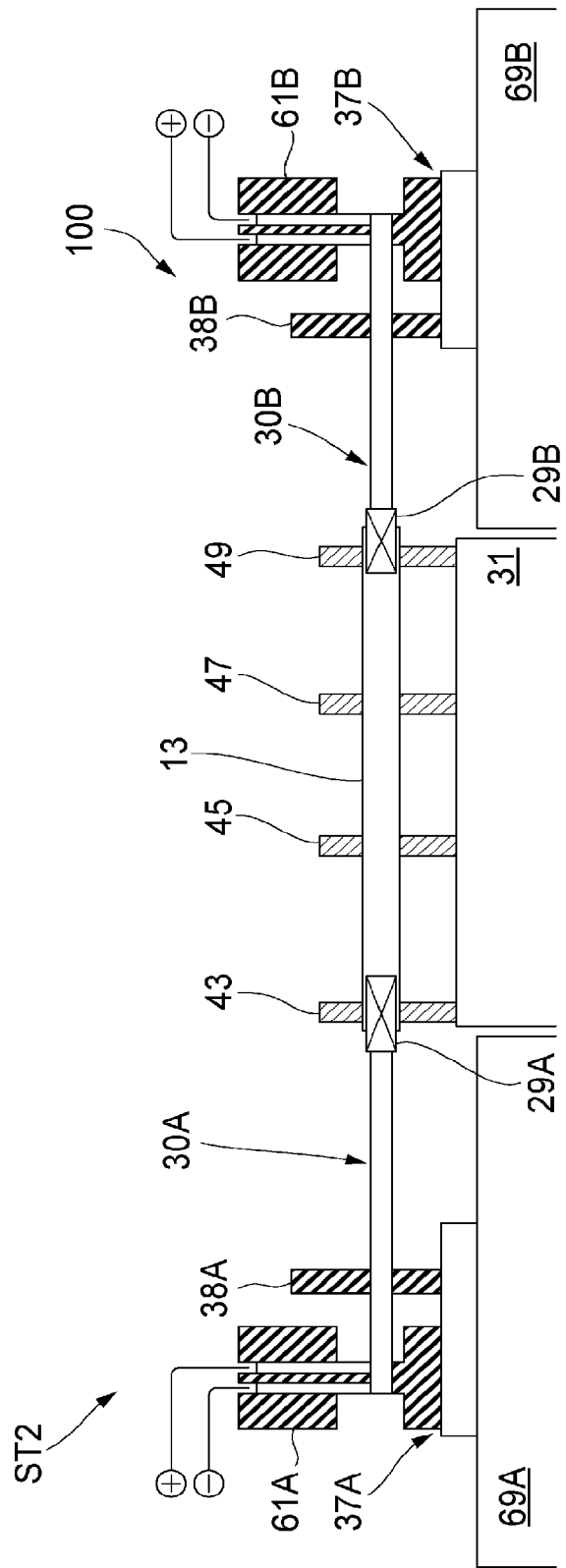

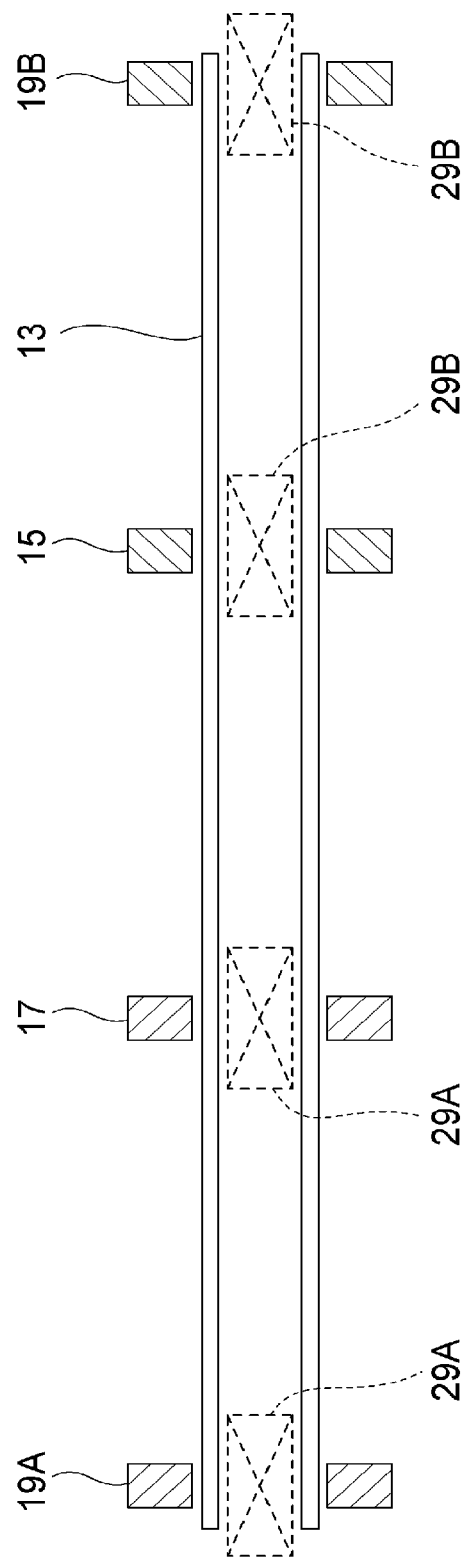

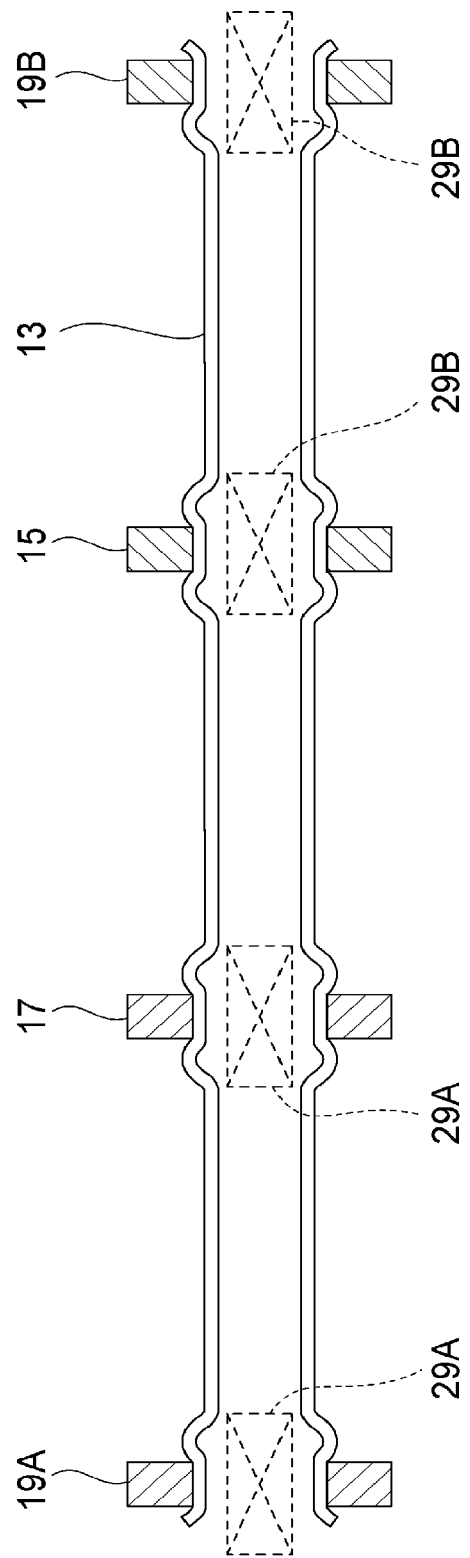

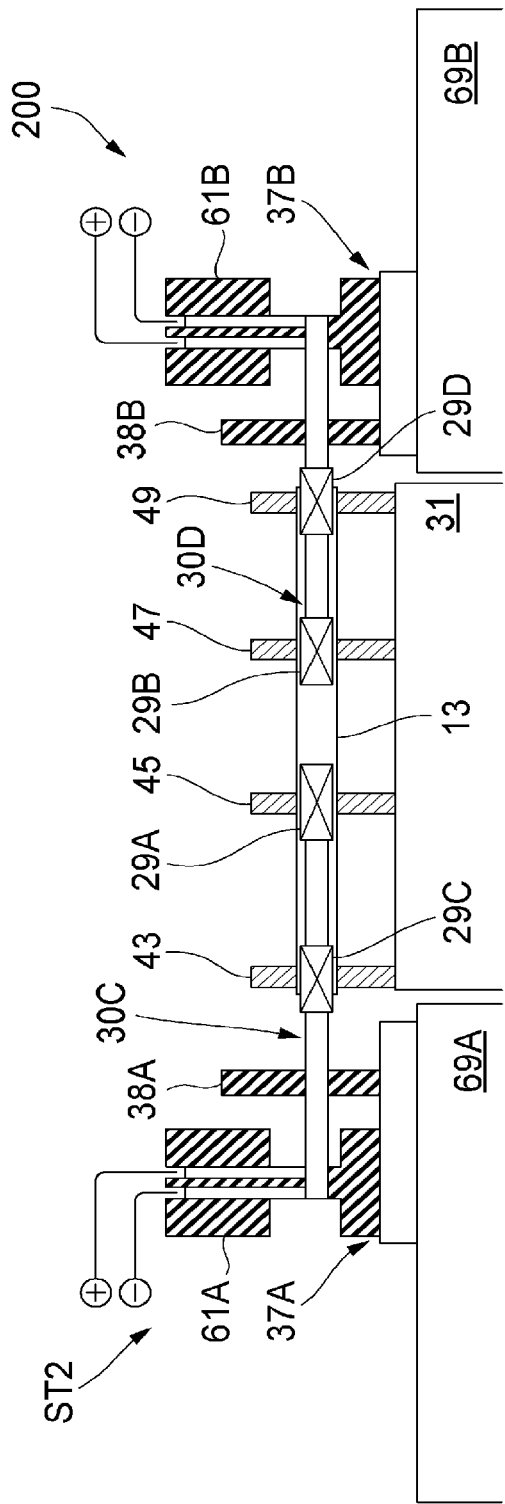

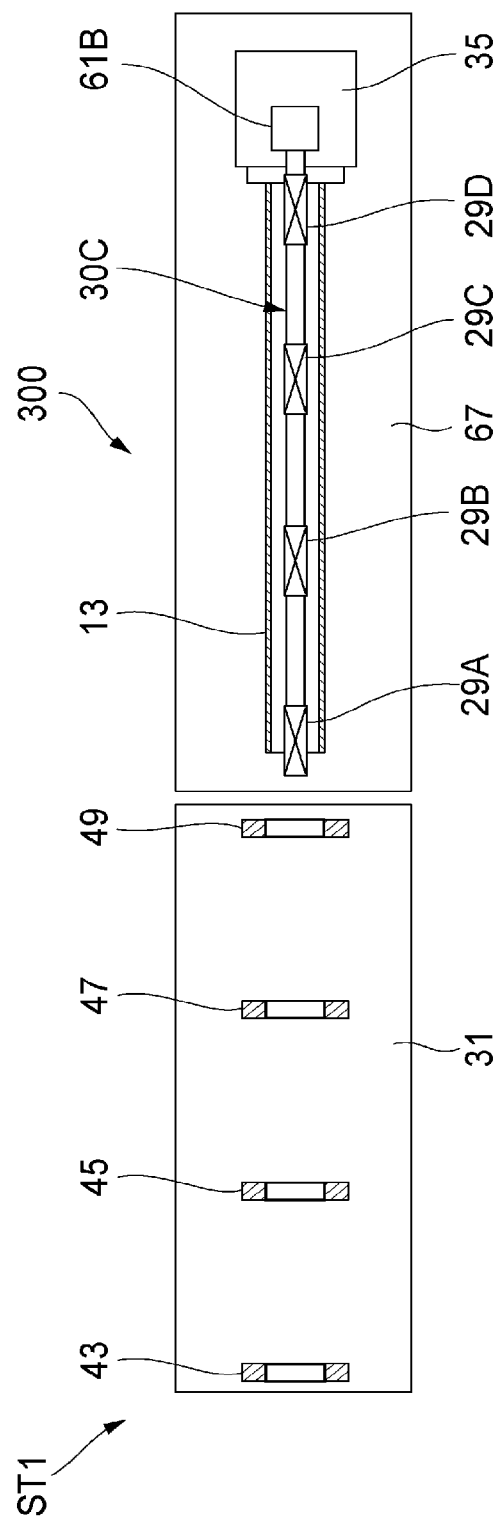

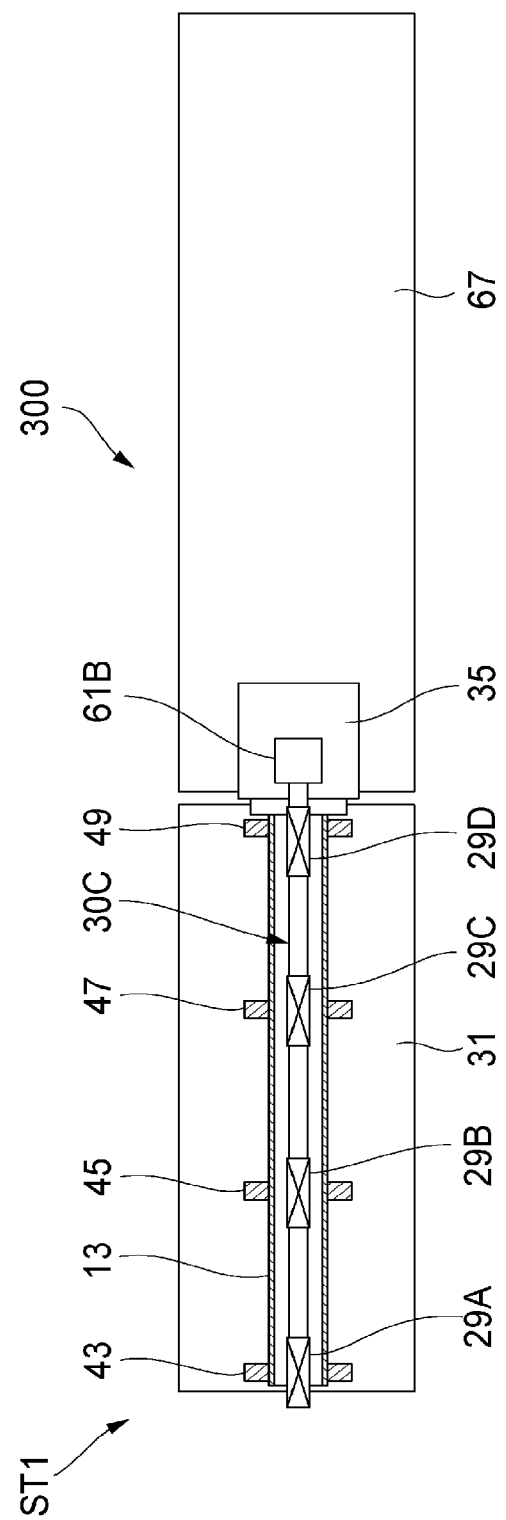

ELECTROMAGNETIC FORMING DEVICE AND ELECTROMAGNETIC FORMING METHOD FOR ALUMINUM TUBE MEMBER

CROSS-REFERENCE TO RELATED APPLICATIONS

This application is a United States national stage application of International Application No. PCT/JP2018/026404, filed Jul. 12, 2018, which designates the United States, and claims priority to Japanese Patent Application No. 2017-136635, filed Jul. 12, 2017, and the entire contents of each of the above applications are hereby incorporated herein by reference in entirety.

TECHNICAL FIELD

The present invention relates to an electromagnetic forming device and an electromagnetic forming method for an aluminum tube member.

BACKGROUND ART

Steel members are commonly used as structural components of automobiles in view of cost and workability in welding and the like. Due to the need for improvement of fuel efficiency in recent years, some automobile structural components made from steel members have been replaced with lightweight members. In addition to panel members, use of such lightweight members as frame members has been examined.

In particular, frame members and reinforcements are formed of elongated tube members whose length is large relative to diameter, and brackets and the like are attached to the outer peripheral surfaces by welding. However, because the attachment of members by welding is highly likely to cause thermal strain, attachment by crimping by tube expansion has been examined. As technologies for crimping by tube expansion, technologies that use liquid pressure and electromagnetic forming are known (PTL 1).

CITATION LIST

Patent Literature

PTL 1: Japanese Unexamined Patent Application Publication No. 2006-264469

SUMMARY OF INVENTION

Technical Problem

With the technology described in PTL 1, forming is performed by applying pressure over the entire length of the tube member. Therefore, it is necessary to place a pressing tool and the like at a portion that need not be expanded, and setting for this is complicated. Moreover, it is not possible to expand a tube member with high accuracy if the tube member has a tube diameter that differs between positions, because tube expansion force differs in accordance with the tube diameter.

Furthermore, there is a case where, on members such as frame members and reinforcements, attachment surfaces for attaching these members to other members or fastener attachments for attaching fasteners such as rivets and nuts are formed. In this case, in addition to tube expansion crimp forming by electromagnetic forming, forming of a protrusion having a flat part, embossing, beading, and the like are performed by using a die (die body). In such processing, it is necessary to place a die after temporarily removing a pressing tool that has been used for tube expansion crimp forming, which causes a problem in that processing steps become complex.

The present invention solves the above problem, and an object of the present invention is to provide an electromagnetic forming device and an electromagnetic forming method for an aluminum tube member that can perform electromagnetic forming with high accuracy by simple steps.

Solution to Problem

The present invention includes the following configurations.

(1) An electromagnetic forming device for an aluminum tube member, including:

a jig plate in which at least one support member having a through hole is fixed onto a substrate;

a tube insertion mechanism that moves a tube member made of an aluminum alloy and the jig plate relative to each other in an axial direction to insert the tube member into the through hole of the support member;

a coil unit including at least one electromagnetic-forming coil portion;

a coil movement mechanism that moves the coil unit in the tube member relative to the tube member in the axial direction to place the electromagnetic-forming coil portion at a tube expansion position of the tube member;

an electric current supply portion that supplies an electric current for electromagnetic forming to the electromagnetic-forming coil portion; and a jig plate transport mechanism that transports the jig plate from a tube insertion stage to a tube expansion stage, the tube insertion stage being a stage where the tube insertion mechanism inserts the tube member into the through hole, the tube expansion stage being a stage where the coil movement mechanism places the electromagnetic-forming coil portion at the tube expansion position of the tube member.

With the electromagnetic forming device for an aluminum tube member, it is possible to transport the tube member from the tube insertion stage where the electromagnetic-forming coil portion is inserted into the tube member to the tube expansion stage where the tube member is expanded by energizing the electromagnetic-forming coil portion in a state in which the electromagnetic-forming coil portion is placed at a desirable expansion position, while the tube member is continued to be supported by the jig plate. Therefore, positioning of the tube member can be performed correctly, and electromagnetic forming can be performed with high accuracy.

(2) The electromagnetic forming device for an aluminum tube member described in (1), in which the tube member includes a first tube member and a second tube member that are disposed coaxially with each other, the second tube member having an inside diameter larger than an outside diameter of the first tube member; and in which an overlapping portion where end portions of the first tube member and the second tube member overlap in a radial direction is formed at the tube expansion position.

With the electromagnetic forming device for an aluminum tube member, it is possible to expand the overlapping portion of the first tube member and the second tube member, which are coaxially placed, to crimp the first and second tube members to each other.

(3) The electromagnetic forming device for an aluminum tube member described in (1) or (2), in which, in the coil unit, the electromagnetic-forming coil portion is disposed at each of a plurality of positions arranged in the axial direction.

With the electromagnetic forming device for an aluminum tube member, it is possible to simultaneously expand the plurality of positions and to reduce the takt time of forming.

(4) The electromagnetic forming device for an aluminum tube member describe in any one of (1) to (3), in which, in the jig plate, a plurality of the support members are fixed onto the substrate so as to be arranged in the axial direction.

With the electromagnetic forming device for an aluminum tube member, it is possible to support the tube member highly parallel to the substrate surface and to increase the accuracy in shape after electromagnetic forming, because the tube member is supported by being inserted into the through holes of the plurality of support members that are fixed onto the substrate.

(5) The electromagnetic forming device for an aluminum tube member described in any one of (1) to (4), in which the coil unit includes a first coil unit that is inserted from one end side of the tube member and a second coil unit that is inserted from the other end side of the tube member, and in which the coil movement mechanism includes a first coil movement mechanism that moves the first coil unit along an axis of the tube member and a second coil movement mechanism that moves the second coil unit along the axis.

With the electromagnetic forming device for an aluminum tube member, it is possible to move the first coil unit and the second coil unit in the axial direction of the tube member to place the electromagnetic-forming coil portions of the first and second coil units at desirable expansion positions. Thus, it is possible to reduce the axial length of the coil unit and to perform electromagnetic forming at a plurality of positions while increasing the positioning accuracy.

(6) The electromagnetic forming device for an aluminum tube member described in any one of (1) to (5), in which the tube expansion stage is provided at each of a plurality of positions arranged in a transport direction of the jig plate, and the electromagnetic-forming coil portion and the coil movement mechanism are provided at each of the tube expansion stages.

With the electromagnetic forming device for an aluminum tube member, because the tube expansion stage is disposed at each of the plurality of positions, it is possible to electromagnetically form a more complex shape simply without complicating the steps, compared with a case where processing is integrally performed at one tube expansion stage.

(7) The electromagnetic forming device for an aluminum tube member described in any one of (1) to (5), in which the jig plate transport mechanism transports the jig plate while the tube member is continued to be inserted in the through hole of the support member.

With the electromagnetic forming device for an aluminum tube member, displacement in the axial direction and axial misalignment do not occur at each stage, because the tube member is transported to the next stage together with the support member without being removed from the support member. As a result, even in a case where electromagnetic forming is performed over a plurality of stages, displacement of electromagnetic forming position does not occur, and the processing accuracy can be improved.

(8) An electromagnetic forming method for an aluminum tube member, the method including the following steps that are performed in sequence:

a tube insertion step of moving a jig plate in which at least one support member having a through hole is fixed onto a substrate and a tube member made of an aluminum alloy relative to each other to insert the tube member into the through hole of the support member;

a step of transporting the jig plate on which the tube member is supported to a next stage;

a coil placement step of moving a coil unit including at least one electromagnetic-forming coil portion and the tube member relative to each other in the tube member to place the electromagnetic-forming coil portion at a tube expansion position of the tube member; and a tube expansion step of supplying an electric current for electromagnetic forming to the electromagnetic-forming coil portion to expand the tube member.

With the electromagnetic forming method for an aluminum tube member, it is possible to transport the tube member from the tube insertion stage where the electromagnetic-forming coil portion is inserted into the tube member to the tube expansion stage where the tube member is expanded by energizing the electromagnetic-forming coil portion in a state in which the electromagnetic-forming coil portion is placed at a desirable expansion position, while the tube member is continued to be supported by the jig plate. Therefore, positioning of the tube member can be performed correctly, and electromagnetic forming can be performed with high accuracy.

(9) The electromagnetic forming method for an aluminum tube member described in (8), including a step of transporting, to a next processing stage, the jig plate on which the tube member that has been expanded is supported.

With the electromagnetic forming method for an aluminum tube member, it is possible to improve the positioning accuracy of the tube member when further processing is performed on the tube member after being expanded. Moreover, the steps do not become complicated, because the tube member after being expanded can be removed at a position other than the tube expansion stage.

(10) The electromagnetic forming method for an aluminum tube member described in (8) or (9), in which the coil placement step and the tube expansion step are sequentially performed at each of a plurality of the tube expansion positions of the tube member.

With the electromagnetic forming method for an aluminum tube member, it is possible to use the same electromagnetic forming coil repeatedly, because electromagnetic forming is sequentially performed at the plurality of expansion positions. Thus, it is possible to reduce the number of electromagnetic forming coils to a necessary minimum and to reduce equipment cost.

(11) The electromagnetic forming method for an aluminum tube member described in (10), in which the electromagnetic-forming coil portion is placed at each of a plurality of the tube expansion positions of the tube member to simultaneously expand the plurality of tube expansion positions of the tube member.

With the electromagnetic forming method for an aluminum tube member, it is possible to simultaneously expand the plurality of positions and to reduce the takt time.

(12) An electromagnetic forming method for an aluminum tube member, the method including the following steps that are performed in sequence:

a step of moving a tube member made of an aluminum alloy and a coil unit including at least one electromagnetic-forming coil portion, the coil unit having been inserted into the tube member so that the electromagnetic-forming coil portion is placed at a tube expansion position of the tube member, and a jig plate in which at least one supporting member having a through hole is fixed onto a substrate, relative to each other while maintaining a positional relationship between the electromagnetic-forming coil portion and the tube expansion position to insert the tube member into the through hole of the support member; and a tube expansion step of expanding the tube member by supplying an electric current for electromagnetic forming to the electromagnetic-forming coil portion.

With the electromagnetic forming method for an aluminum tube member, it is possible to further simplify the forming steps, because the tube member can be set on the jig plate in a state in which the coil unit has been inserted into the tube member.

Advantageous Effects of Invention

With the electromagnetic forming device and the electromagnetic forming method for an aluminum tube member according to the present invention, it is possible to perform electromagnetic forming with high accuracy by simple steps.

BRIEF DESCRIPTION OF DRAWINGS

FIG. 4A illustrates in a stepwise manner a tube insertion step of inserting an aluminum tube member into support members of the jig plate.

FIG. 4B illustrates in a stepwise manner the tube insertion step of inserting the aluminum tube member into the support members of the jig plate.

FIG. 5A illustrates in a stepwise manner a step of expanding the aluminum tube member, which is supported by the jig plate, by inserting electromagnetic-forming coil portions into the aluminum tube member.

FIG. 5B illustrates in a stepwise manner the step of expanding the aluminum tube member, which is supported by the jig plate, by inserting the electromagnetic-forming coil portions into the aluminum tube member.

FIG. 5C illustrates in a stepwise manner the step of expanding the aluminum tube member, which is supported by the jig plate, by inserting the electromagnetic-forming coil portions into the aluminum tube member.

FIG. 6A is a sectional view of the aluminum tube member before electromagnetic forming.

FIG. 6B is a sectional view of the aluminum tube member after electromagnetic forming.

FIG. 7B illustrates in a stepwise manner the tube-expansion step of expanding the aluminum tube member, which is supported by the jig plate, by inserting the electromagnetic-forming coil portions into the aluminum tube member in the electromagnetic forming device according to the second embodiment.

FIG. 8A is a plan view of an electromagnetic forming device according to a third embodiment, illustrating in a stepwise manner a tube-expansion step performed by using the electromagnetic forming device.

FIG. 8B is a plan view of the electromagnetic forming device according to the third embodiment, illustrating in a stepwise manner the tube-expansion step performed by using the electromagnetic forming device.

DESCRIPTION OF EMBODIMENTS

Hereafter, embodiments of the present invention will be described in detail with reference to the drawings.

<Configuration of Formed Article>

Figure 1:
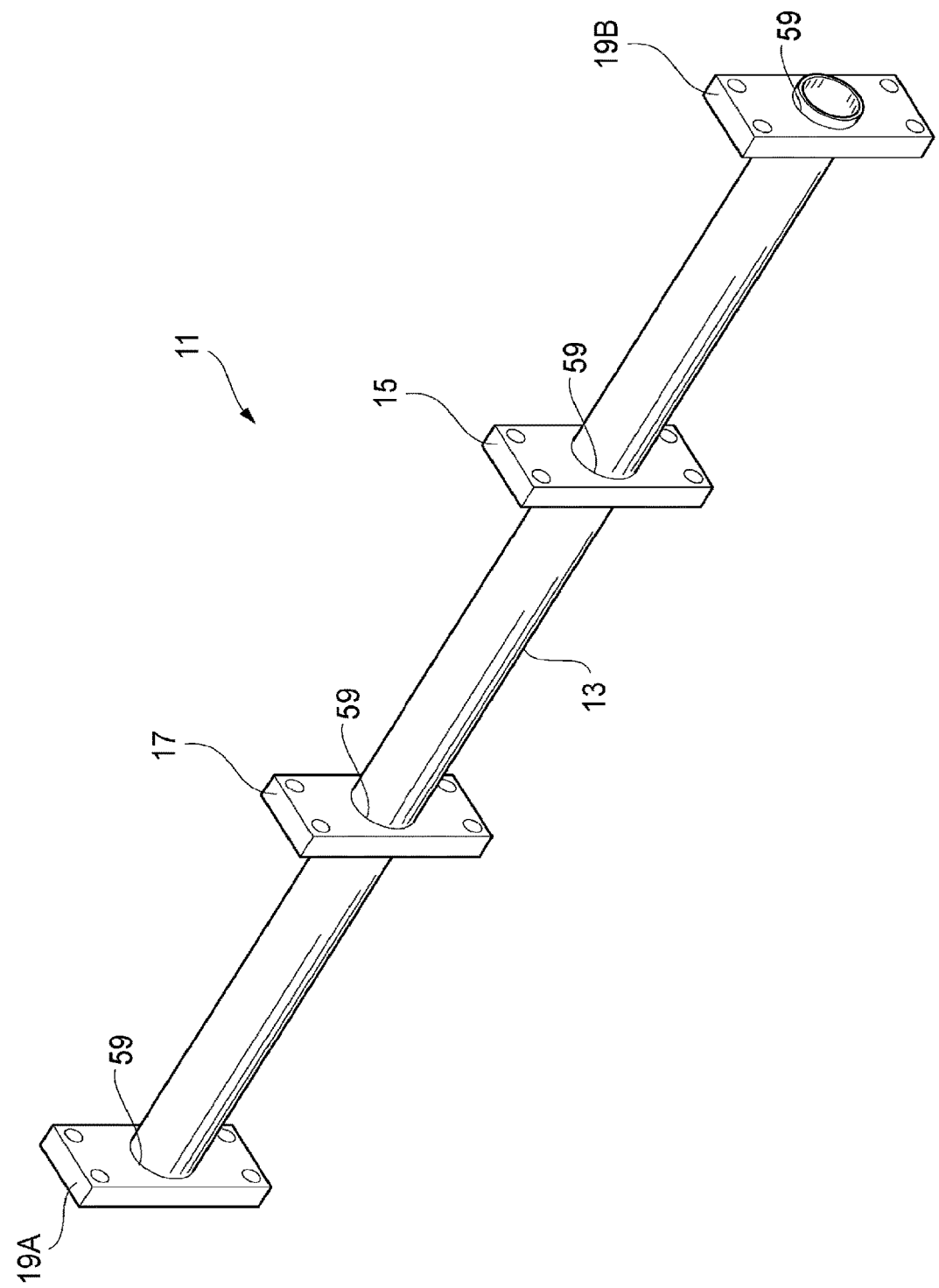
FIG. 1 is an external perspective view schematically illustrating a formed article that is electromagnetically formed.

FIG. 1 is an external perspective view schematically illustrating a formed article that is electromagnetically formed.

A formed article 11 includes an aluminum tube member 13, brackets 15 and 17 disposed on the outer periphery of the aluminum tube member 13, and brackets 19A and 19B disposed at both ends of the aluminum tube member 13. Each of the brackets 15, 17, 19A, and 19B has a through hole 59, and the aluminum tube member 13 is fixed in a state of being inserted through the through holes 59.

The aluminum tube member 13 is not limited to a circular tube, and may be a quadrangular tube whose cross-sectional shape is a square or a rectangle, a pentagonal tube whose cross-sectionals shape is a pentagon, or an octagonal tube whose cross-sectional shape is an octagon. The aluminum tube member 13 can be manufactured by extrusion or by welding a plate material. Examples of materials suitable for the aluminum tube member 13 include aluminum alloys (JIS 6000 series, JIS 7000 series, and the like).

The brackets 15, 17, 19A, and 19B (hereafter, referred to collectively as "brackets") are rigid members that are integrated with the aluminum tube member 13. Examples of materials suitable for the brackets include steel, extruded aluminum, cast aluminum, and injection-molded resin.

<Electromagnetic Forming Device According to First Embodiment>

Next, the structure of an electromagnetic forming device 100 for making the formed article 11, in which the brackets are crimped to the outer periphery of the aluminum tube member 13, by electromagnetic forming will be described.

Figure 2:
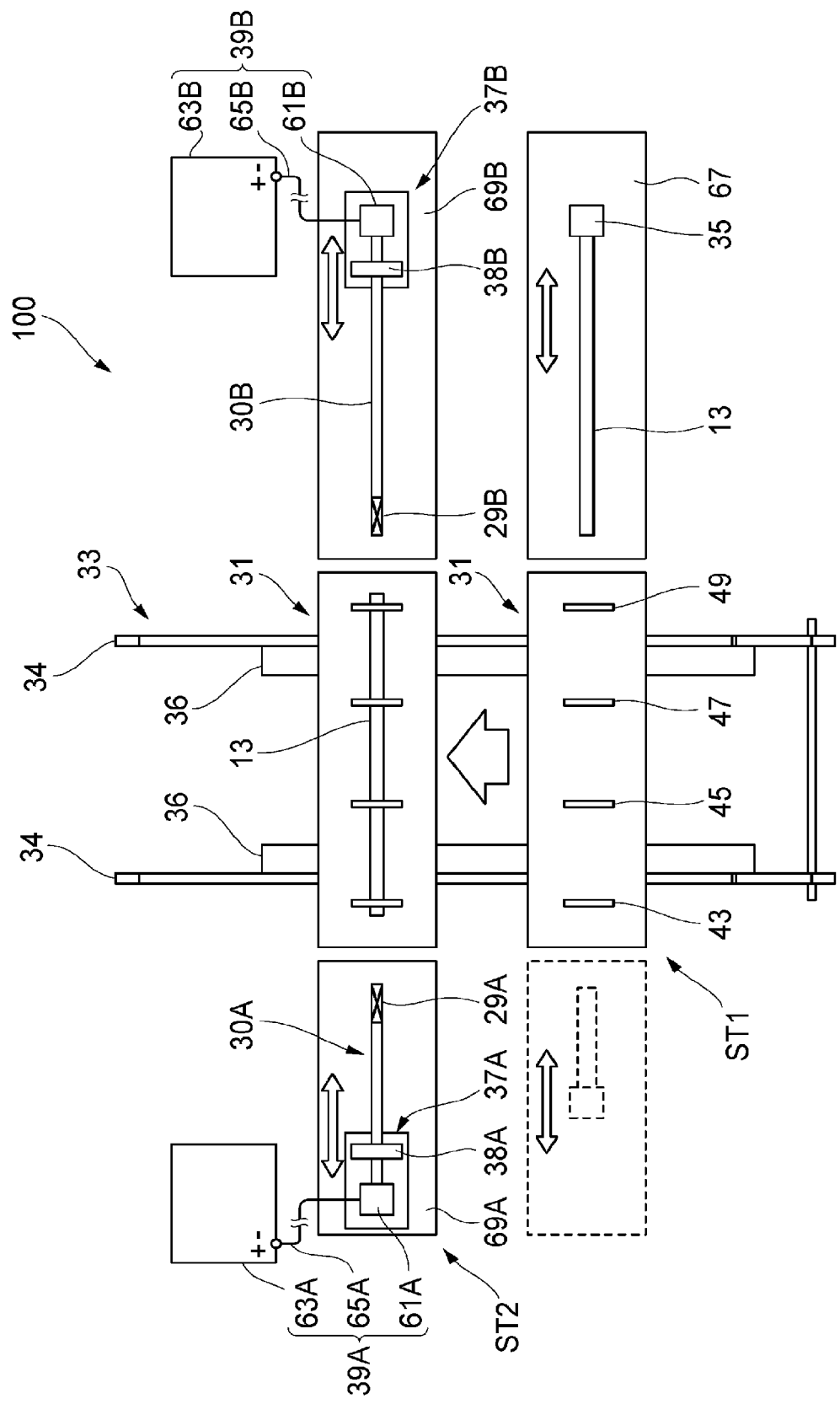
FIG. 2 is a schematic plan view of an electromagnetic forming device according to a first embodiment.

FIG. 2 is a schematic plan view of the electromagnetic forming device 100 according to the first embodiment.

The electromagnetic forming device 100 includes a plurality of jig plates 31, a jig plate transport mechanism 33, a tube insertion mechanism 35, a first coil unit 30A, a second coil unit 30B, a first coil movement mechanism 37A, a second coil movement mechanism 37B, and electric current supply portions 39A and 39B. Hereafter, details of these portions will be described sequentially.

The electromagnetic forming device 100 further includes a tube insertion stage ST1 and a tube expansion stage ST2. These stages will be schematically described. At the tube insertion stage ST1, the tube insertion mechanism 35 transfers the aluminum tube member 13 to the jig plate 31. The jig plate transport mechanism 33 transports the jig plate 31, into which the tube member has been inserted, from the tube insertion stage ST1 to the tube expansion stage ST2.

At the tube expansion stage ST2, the first coil movement mechanism 37A inserts the first coil unit 30A into the aluminum tube member 13, which is supported by the jig plate 31. The second coil movement mechanism 37B inserts the second coil unit 30B into the aluminum tube member 13, which is supported by the jig plate 31. Then, the electric current supply portion 39A supplies an electric current for electromagnetic forming to a first electromagnetic-forming coil portion 29A of the first coil unit 30A. The electric current supply portion 39B supplies an electric current for electromagnetic forming to a second electromagnetic-forming coil portion 29B of the second coil unit 30B. Thus, the aluminum tube member 13 is expanded by electromagnetic forming.

<Jig Plate>

Figure 3:
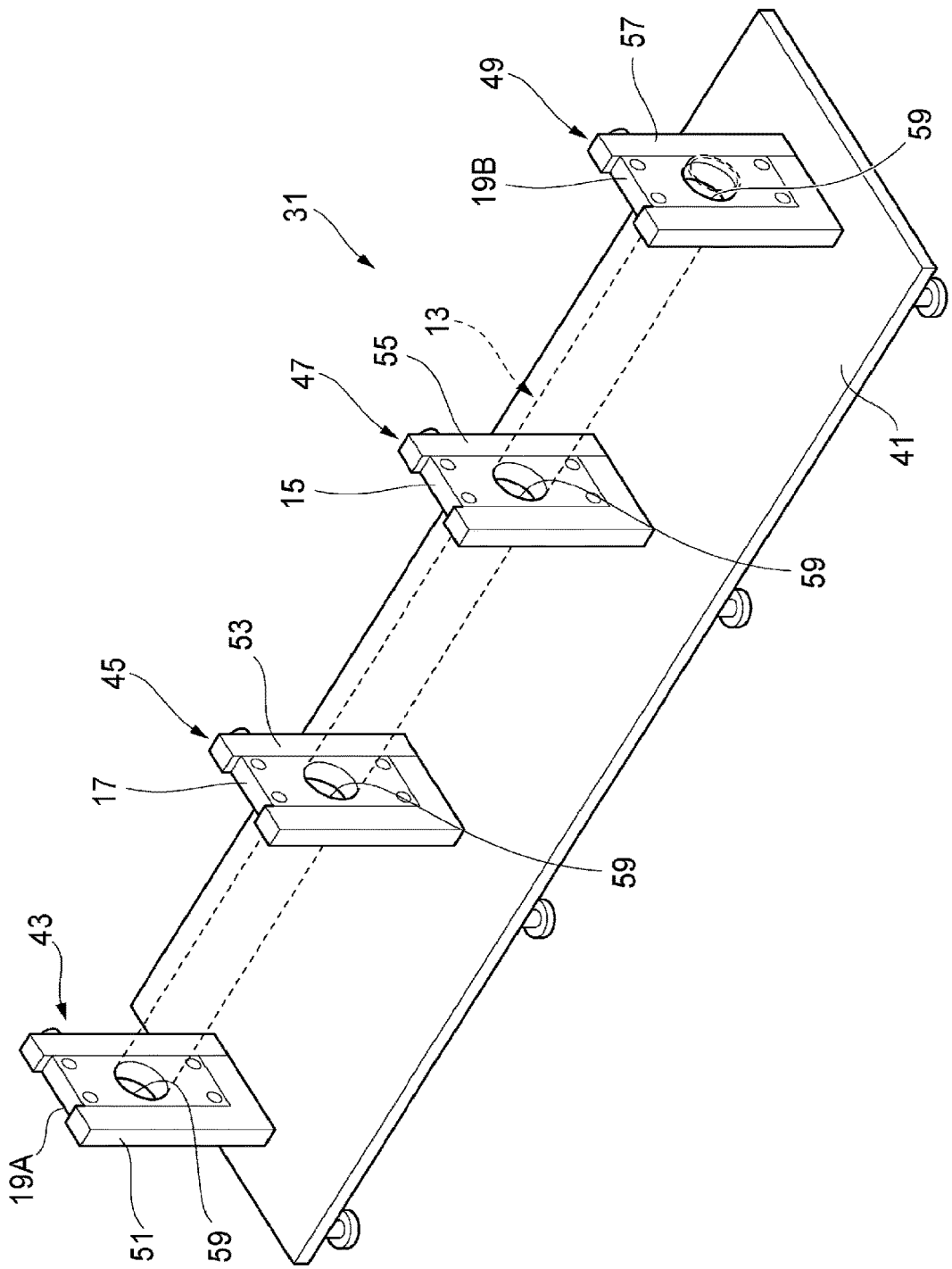
FIG. 3 is a perspective view of a jig plate.

FIG. 3 is a perspective view of the jig plate 31. FIG. 3 illustrates the aluminum tube member 13 by dotted lines, and also illustrates the brackets 15, 17, 19A, and 19B that are fixed to the aluminum tube member 13.

The jig plate 31 includes a substrate 41 and bracket holders 51, 53, 55, and 57 that are fixed onto the substrate 41.

The substrate 41 is made from a single steel plate. Instead of steel, an aluminum alloy or a resin material may be used. The resin material may be a fiber reinforced plastic, such as a carbon-fiber reinforced plastic (CFRP).

The bracket holder 51 holds the bracket 19A and constitutes a support member 43 together with the bracket 19A. Likewise, the bracket holder 53 holds the bracket 17 and constitutes a support member 45, the bracket holder 55 holds the bracket 15 and constitutes a support member 47, and the bracket holder 57 holds the bracket 19B and constitutes a support member 49. The bracket holders 51, 53, 55, and 57 fix the brackets by fastening the brackets from the outside in the radial direction by using toggle clamps (not shown) and the like.

The through holes 59, through which the aluminum tube member 13 is inserted, are coaxially arranged in the brackets 15, 17, 19A, and 19B, which are fixed to the bracket holders 51, 53, 55, and 57. That is, all of the through holes 59 are coaxially arranged in the support members 43, 45, 47, and 49, which stand on the jig plate 31. The through holes 59 guide the aluminum tube member 13 when the aluminum tube member 13 is being inserted.

The jig plate 31 needs to have high rigidity in order to hold an elongated member, whose axial length is large relative to diameter, with only a slight bend. Therefore, preferably, a high-rigidity metal plate, such as a steel plate or an aluminum alloy plate, is used as the substrate 41 of the jig plate 31.

An induced electric current is generated in the aluminum tube member 13 when the electromagnetic-forming coil portion (the first electromagnetic-forming coil portion 29A and the second electromagnetic-forming coil portion 29B in FIG. 2) is energized. The induced electric current may be conducted to the substrate 41 of the jig plate 31 via the support members 43, 45, 47, and 49 and may spark. Therefore, preferably, the substrate 41 of the jig plate 31 includes an insulating layer having electrical insulation ability. As the insulating layer, for example, a phenolic resin (Bakelite (registered trademark)) or the like can be used.

By providing the substrate 41 with the insulating layer, an induced electric current generated in the aluminum tube member 13 does not leak to the outside. Preferably, the insulating layer is formed on the entirety of the lower surface of the substrate 41 of the jig plate 31. In this case, conduction of the induced electric current can be more reliably blocked. Moreover, compared with a case where the insulating layer is formed on the upper surface of the substrate 41, displacement of the support members 43, 45, 47, and 49 due to irregular distribution of the thickness of the insulating layer does not occur. Accordingly, the aluminum tube member 13 can be supported in a state of being positioned with high accuracy.

<Tube Insertion Mechanism>

Abase 67 is disposed on one end side of the jig plate 31 at the tube insertion stage ST1 illustrated in FIG. 2. The tube insertion mechanism 35 is disposed on the base 67. The tube insertion mechanism 35 moves the aluminum tube member 13 toward the jig plate 31 in the axial direction. Thus, the tube insertion mechanism 35 inserts the aluminum tube member 13 into the through holes 59 of the support members 43, 45, 47, and 49.

The base 67 is disposed on the same setting surface as the jig plate transport mechanism 33. Therefore, the upper surface of the base 67 can be maintained highly parallel to the substrate 41 of the jig plate 31, which is placed on the jig plate transport mechanism 33. During tube insertion, the through holes 59 of the support members 43, 45, 47, and 49 on the jig plate 31 function as guide holes for guiding the aluminum tube member 13. Thus, the aluminum tube member 13 is supported by the support members 43, 45, 47, and 49 without, axial misalignment.

<Coil Unit>

The first coil unit 30A and the second coil unit 30B are disposed on both sides of the jig plate 31 at the tube expansion stage ST2. The first electromagnetic-forming coil portion 29A is disposed at the distal end of the first coil unit 30A on the aluminum tube member 13 side, and the second electromagnetic-forming coil portion 29B is disposed at the distal end of the second coil unit 30B on the aluminum tube member 13 side.

The first electromagnetic-forming coil portion 29A and the second electromagnetic-forming coil portion 29B are portions of the first coil unit 30A and the second coil unit 30B in each of which a lead wire is wound around an axial core member and each of which generates a magnetic force that contributes to electromagnetic forming.

That is, the first coil unit 30A and the second coil unit 30B are disposed so as to face each other in the axial direction.

A region of the first coil unit 30A excluding the first electromagnetic-forming coil portion 29A at the distal end is formed of a support body made of a resin. A lead wire (not shown), which is connected to the first electromagnetic-forming coil portion 29A, is embedded in the support body. Likewise, a region of the second coil unit 30B excluding the second electromagnetic-forming coil portion 29B is formed of a support body made of a resin. A lead wire (not shown), which is connected to the second electromagnetic-forming coil portion, is embedded in the support body. Coil terminal portions 61A and 61B (described below) are respectively connected to the proximal ends of the first coil unit 30A and the second coil unit 30B.

<Coil Movement Mechanism>

Bases 69A and 69B are disposed on both sides of the jig plate 31 at the tube expansion stage ST2. The first coil movement mechanism 37A that supports the first coil unit 30A is disposed on the base 69A, and the second coil movement mechanism 37B that supports the second coil unit 30B is disposed on the base 69B.

The first coil movement mechanism 37A includes a chucking portion 38A that grasps the first coil unit 30A and that is made of an electrically insulating material, and a driving portion (not shown) such as a ball spline or a linear movement mechanism. The driving portion drives the first coil unit 30A so as to be movable back and forth in the axial direction. Likewise, the second coil movement mechanism 37B includes a chucking portion 38B that grasps the second coil unit 30B and that is made of an electrically insulating material, and a driving portion (not shown) described above. The driving portion drives the second coil unit 30B so as to be movable back and forth in the axial direction.

The first coil movement mechanism 37A inserts the first coil unit 30A into the aluminum tube member 13 so as to be coaxial with the aluminum tube member 13. The second coil movement mechanism 37B inserts the second coil unit 30B into the aluminum tube member 13 so as to be coaxial with the aluminum tube member 13. The first coil unit 30A and the second coil unit 30B may be inserted simultaneously or with a time lag.

It is possible to place the first electromagnetic-forming coil portion 29A and the second electromagnetic-forming coil portion 29B at desirable tube expansion positions by moving the first coil unit 30A with the first coil movement mechanism 37A and by moving the second coil unit 30B with the second coil movement mechanism 37B.

<Electric Current Supply Portion>

The electric current supply portion 39A supplies an electric current for electromagnetic forming to the first electromagnetic-forming coil portion 29A, and the electric current supply portion 39B supplies an electric current for electromagnetic forming to the second electromagnetic-forming coil portion 29B. The electric current supply portion 39A includes the coil terminal portion 61A disposed on the proximal end side of the first coil unit 30A, an electric power source 63A, and a high-voltage power supply cable 65A that connects the electric power source 63A and the coil terminal portion 61A. The electric current supply portion 39B includes the coil terminal portions 61B disposed on the proximal end side of the second coil unit 30B, an electric power source 63B, and a high-voltage power supply cable 65B that connects the electric power source 63B and the coil terminal portion 61B.

The electric power sources 63A and 63B each output energy, which is stored in a capacitor, through a switch as a pulse-shaped large electric current for a very short time of several milliseconds or less. The output pulse electric current is supplied to the first electromagnetic-forming coil portion 29A and the second electromagnetic-forming coil portion 29B through the high-voltage power supply cables 65A and 65B. As the switch, a gap switch, a thyratron switch, a semiconductor switch, a mechanical switch, an ignitron switch, or the like can be used.

<Jig Plate Transport Mechanism>

The jig plate transport mechanism 33 includes a pair of transport rails 34, and transport conveyers 36 that are disposed along the transport rails 34 and in which conveyer chains circulate. The jig plate 31 is placed on the transport conveyers 36, and the transport conveyers 36 drive the conveyer chains to transport the jig plate 31 along the transport rails 34. That is, the jig plate transport mechanism 33 transports the jig plate 31 from the tube insertion stage ST1 to the tube expansion stage ST2 along the transport rails 34.

Instead of the method described above, the jig plate transport mechanism 33 may use various transport methods, such as a belt transport method and a walking beam method. In view of reduction of equipment installation space and reduction of tact time, preferably, the tube insertion stage ST1 and the tube expansion stage ST2 are disposed side by side so that the tube insertion direction and the direction in which the coil units move back and forth (axial direction) are aligned parallel to each other. Preferably, the jig plate 31 is transported in a direction perpendicular to the axial direction.

<Electromagnetic Forming Steps for Aluminum Tube Member>

Next, steps of an electromagnetic forming method for electromagnetically forming the aluminum tube member 13 illustrated in FIG. 1 by using the electromagnetic forming device 100 will be sequentially described.

FIGS. 4A and 4B illustrate in a stepwise manner a tube insertion step of inserting the aluminum tube member 13 into the support members 43, 45, 47, and 49 of the jig plate.

First, the aluminum tube member 13 is prepared. As illustrated in FIG. 4A, the aluminum tube member 13 is attached to a chucking mechanism of the tube insertion mechanism 35.

The brackets 19A, 17, 15, and 19B (see FIG. 3) are attached to the support members 43, 45, 47, and 49 of the jig plate 31. The brackets are fixed to the bracket holders 51, 53, 55, and 57 in such a way that the through holes 59 are coaxial with each other. That is, the aluminum tube member 13 and the through holes 59 of the support members 43, 45, 47, and 49 are coaxially arranged along an axis Ax.

(Tube Insertion Step)

Next, the tube insertion mechanism 35 is driven to move the aluminum tube member 13 toward the jig plate 31 as illustrated in FIG. 4B. Then, the aluminum tube member 13 is inserted, from a tube end portion 13a, sequentially into the through holes 59 of the support member 49, the support member 47, the support member 45, and the support member 43; and is placed at a position such that the tube end portion 13a protrudes from the through hole 59 of the support member 43.

In this state, the aluminum tube member 13 is held in a state of being positioned with high accuracy by the support members 43, 45, 47, and 49 with the axis Ax as an axis. After transferring the aluminum tube member 13 to the jig plate 31, the tube insertion mechanism 35 is moved backward to a retracted position shown in FIG. 4A.

(Jig Plate Transport Step)

Next, the jig plate transport mechanism 33 transports the jig plate 31, on which the aluminum tube member 13 is supported as described above at the tube insertion stage ST1 illustrated in FIG. 2, to the tube expansion stage ST2 by using the jig plate transport mechanism 33.

FIGS. 5A, 5B, and 5C illustrate in a stepwise manner a step of expanding the aluminum tube member 13, which is supported by the jig plate 31, by inserting electromagnetic-forming coil portions into the aluminum tube member 13.

As illustrated in FIG. 5A, at the jig plate 31 transported to the tube expansion stage ST2, the first coil unit 30A, which is supported by the chucking portion 38A of the first coil movement mechanism 37A, and the second coil unit 30B, which is supported by the chucking portion 38B of the second coil movement mechanism 37B, are placed coaxially so as to face each other.

(Coil Placement Step)

Next, as illustrated in FIG. 5B, the first coil movement mechanism 37A and the second coil movement mechanism 37B respectively move the first coil unit 30A and the second coil unit 30B toward the jig plate 31. The first coil unit 30A is inserted from one end side of the aluminum tube member 13, and the second coil unit 30B is inserted from the other end side of the aluminum tube member 13. Then, the first electromagnetic-forming coil portion 29A, which is disposed at the distal end of the first coil unit 30A, is placed at the axial position of the support member 45, and the second electromagnetic-forming coil portion 29B, which is disposed at the distal end of the second coil unit 30B, is placed at the axial position of the support member 47.

(Tube Expansion Step)

Next, in the state illustrated in FIG. 5B, the electric current supply portions 39A and 39B (see FIG. 2) energize the first electromagnetic-forming coil portion 29A and the second electromagnetic-forming coil portion 29B. Thus, the aluminum tube member 13 is expanded by electromagnetic forming at the position of the support member 45 and at the position of the support member 47, and the aluminum tube member 13 is crimped to the support members 47 and 45 by being expanded.

Moreover, as illustrated in FIG. 5C, the first coil movement mechanism 37A moves the first coil unit 30A in the axial direction to place the first electromagnetic-forming coil portion 29A at the axial position of the support member 43. The second coil movement mechanism 37B moves the second coil unit 30B in the axial direction to place the second electromagnetic-forming coil portion 29B at the axial position of the support member 49.

In this state, the electric current supply portions 39A and 39B (see FIG. 2) energize the first electromagnetic-forming coil portion 29A and the second electromagnetic-forming coil portion 29B. Thus, the aluminum tube member 13 is expanded by electromagnetic forming at the positions of the support members 43 and 49 and crimped to the support members 43 and 49.

Through the step described above, the aluminum tube member 13 is crimped to the support members 43, 45, 47, and 49, that is, the brackets 19A, 17, 15, and 19B (see FIG. 3).

FIG. 6A is a sectional view of the aluminum tube member 13 before electromagnetic forming, and FIG. 6B is a sectional view of the aluminum tube member 13 after electromagnetic forming.

The aluminum tube member 13 after electromagnetic forming is expanded at the positions where the first electromagnetic-forming coil portion 29A and the second electromagnetic-forming coil portion 29B are placed. That is, at the axial position of the bracket 15, the aluminum tube member 13 is expanded by electromagnetic forming and crimped to the bracket 15. Likewise, at the axial positions of the brackets 17, 19A, and 19B, the aluminum tube member 13 is crimped respectively to the brackets 17, 19A, and 19B. Thus, the formed article 11 in the state illustrated in FIG. 1 is obtained.

After electromagnetic forming is performed as described above, the formed article 11, to which the brackets 15, 17, 19A, and 19B are crimped and fixed, is taken out by loosening the bracket holders 51, 53, 55, and 57 of the support members 43, 45, 47, and 49 illustrated in FIG. 3.

The formed article 11 may be taken out at the tube expansion stage ST2 illustrated in FIG. 2. Alternatively, the formed article 11 may be taken out at a position beyond the tube expansion stage ST2 in the transport direction by transporting the jig plate 31 further in the transport direction by using the jig plate transport mechanism 33.

In the electromagnetic forming device 100 for an aluminum tube member according to the present embodiment, the first electromagnetic-forming coil portion 29A and the second electromagnetic-forming coil portion 29B, each of which has a small length relative to the entire length of the aluminum tube member 13, are respectively placed at desirable forming positions, and the aluminum tube member 13 is expanded by electromagnetic forming. Thus, compared with a case where an electromagnetic-forming coil portion is placed over the entire length of the aluminum tube member 13, loss of an electric current, that flows through the electromagnetic-forming coil portion can be reduced. Therefore, a necessary and sufficient amount of electric current can be supplied to a position where tube expansion by electromagnetic forming is necessary, and variation in the degree to which the aluminum tube member 13 is electromagnetically expanded does not occur. Thus, electromagnetic forming can be performed with high accuracy. Moreover, the brackets 15, 17, 19A, and 19B are firmly crimped to the aluminum tube member 13 at the respective placement positions.

With the electromagnetic forming device 100 according to the present embodiment, the aluminum tube member 13 is crimped to the support members 43, 45, 47, and 49 on the jig plate 31 with high accuracy. Moreover, the first coil unit 30A and the second coil unit 30B are coaxially supported by the first coil movement mechanism 37A and the second coil movement mechanism 37B with high accuracy. The jig plate transport mechanism 33 transports the jig plate 31, on which the aluminum tube member 13 is supported by the support members 43, 45, 47, and 49, to the next tube expansion stage ST2 while maintaining the supported state, that is, while the axis of the aluminum tube member 13 is continued to be held by the jig plate 31.

Thus, without complicating the steps, the first coil movement mechanism 37A and the second coil movement mechanism 37B can insert the first coil unit 30A and the second coil unit 30B into the aluminum tube member 13 while maintaining the coil units 30A and 30B highly parallel to the aluminum tube member 13. Thus, the first coil unit 30A and the second coil unit 30B can be smoothly inserted into the aluminum tube member 13 without causing interference with the aluminum tube member 13, and the first electromagnetic-forming coil portion 29A and the second electromagnetic-forming coil portion 29B can be placed correctly at desirable expansion positions. In this way, the coil placement step and the tube expansion step can be sequentially performed at each of a plurality of tube expansion positions of the aluminum tube member 13.

Moreover, in the jig plate 31, the support members 43, 45, 47, and 49, which support the aluminum tube member 13, are fixed to the same substrate 41 having high rigidity. Therefore, the axis of the aluminum tube member 13 can be positioned with high accuracy.

By providing the tube insertion stage ST1 and the tube expansion stage ST2 independently and configuring so that the jig plate 31 is sequentially transported from ST1 to ST2, the tube insertion step and the tube expansion step for the aluminum tube members 13 can be simultaneously performed at the stages. As a result, the takt time of manufacturing the formed article 11 can be reduced to be suitable for mass production.

The tube insertion stage ST1 illustrated in FIG. 2 has a configuration such that the aluminum tube member 13 is moved from only one side of the jig plate 31. However, the configuration of the tube insertion stage ST1 is not limited to this. For example, as shown by dotted lines in the figure, the tube insertion stage ST1 may have a configuration such that aluminum tube members are set on the jig plate 31 at the tube insertion stage ST1 by moving the aluminum tube members from both sides in the axial direction of the jig plate 31. In this case, the aluminum tube members have a diameter difference that enables an overlapping portion, where the tube members overlap in the radial direction, to be formed when a tube end portion of one of the aluminum tube members is inserted into a tube end portion of the other aluminum tube member; and each of the aluminum tube members is supported by one or more of the support members 43, 45, 47, and 49.

<Electromagnetic Forming Device According to Second Embodiment>

Next, an electromagnetic forming device for an aluminum tube member according to a second embodiment will be described.

Figure 7A:
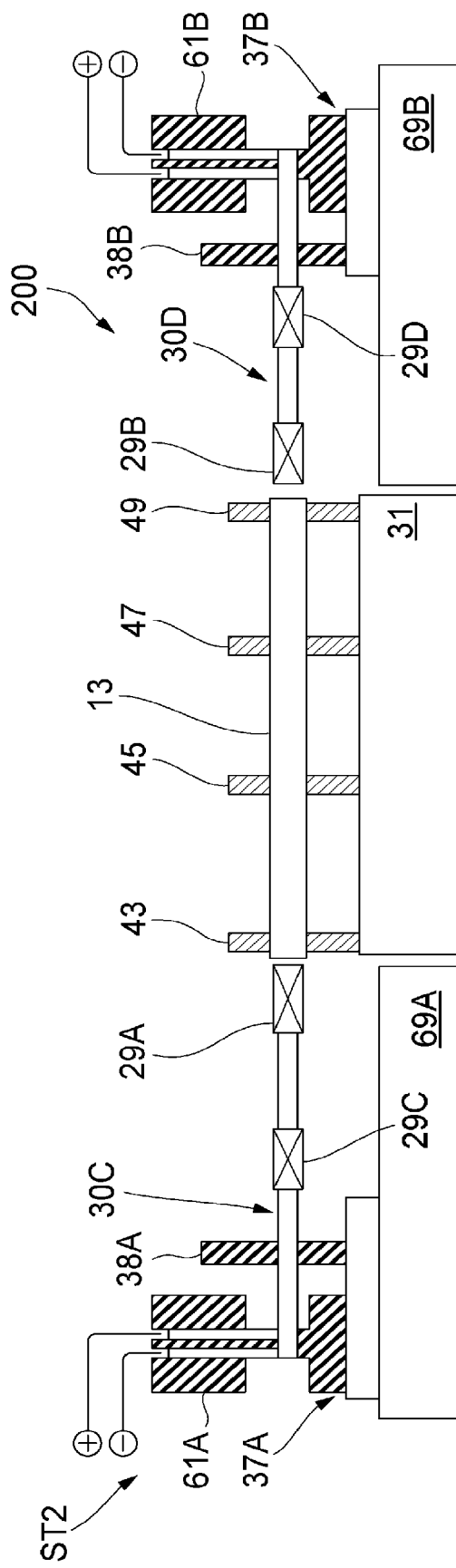
FIG. 7A illustrates in a stepwise manner a tube-expansion step of expanding an aluminum tube member, which is supported by a jig plate, by inserting electromagnetic-forming coil portions into the aluminum tube member in an electromagnetic forming device according to a second embodiment.

FIGS. 7A and 7B illustrate in a stepwise manner a tube-expansion step of expanding the aluminum tube member 13, which is supported by the jig plate 31, by inserting electromagnetic-forming coil portions into the aluminum tube member 13 in an electromagnetic forming device 200 according to the second embodiment.

The electromagnetic forming device 200 according to the present embodiment includes, instead of the first coil unit 30A and the second coil unit 30B (see FIG. 5A) of the electromagnetic forming device 100 according to the first embodiment, a third coil unit 30C and a fourth coil unit 30D each having electromagnetic-forming coil portions at a plurality of positions arranged in the axial direction (at two positions in the example illustrated in the figure). In other respects, the electromagnetic forming device 200 has a similar configuration to the electromagnetic forming device 100. In the following description, the same members and the same portions will be denoted by the same numerals, and descriptions thereof will be simplified or omitted.

The third coil unit 30C according to the present embodiment includes, from the distal end on the jig plate 31 side, a first electromagnetic-forming coil portion 29A and a third electromagnetic-forming coil portion 29C. A region between the first electromagnetic-forming coil portion 29A and the third electromagnetic-forming coil portion 29C and a region on the proximal end side of the third electromagnetic-forming coil portion 29C are formed of resin support bodies. In the resin support bodies, lead wires connected to the respective coils are embedded.

Likewise, the fourth coil unit 30D includes, from the distal end on the jig plate 31 side, a second electromagnetic-forming coil portion 29B and a fourth electromagnetic-forming coil portion 29D. A region between the second electromagnetic-forming coil portion 29B and the fourth electromagnetic-forming coil portion 29D and a region on the proximal end side of the fourth electromagnetic-forming coil portion 29D are formed of resin support bodies. In the resin support bodies, lead wires connected to the respective coils are embedded.

The distance between the coil centers of the first electromagnetic-forming coil portion 29A and the third electromagnetic-forming coil portion 29C is equal to the distance between the support member 45 and the support member 43. The distance between the coil centers of the second electromagnetic-forming coil portion 29B and the fourth electromagnetic-forming coil portion 29D is equal to the distance between the support member 47 and the support member 49.

As illustrated in FIG. 7B, from the state illustrated in FIG. 7A, the electromagnetic forming device 200 according to the present embodiment moves the third coil unit 30C in the axial direction by using the first coil movement mechanism 37A, and moves the fourth coil unit 30D in the axial direction by using the second coil movement mechanism 37B. When the first electromagnetic-forming coil portion 29A is placed at the axial position of the support member 45 due to the movement of the third coil unit 30C, the third electromagnetic-forming coil portion 29C is placed at the axial position of the support member 43. When the second electromagnetic-forming coil portion 29B is placed at the axial position of the support member 47 due to the movement of the fourth coil unit 30D, the fourth electromagnetic-forming coil portion 29D is placed at the axial position of the support member 49.

By energizing the electromagnetic-forming coil portions 29A, 29B, 29C, and 29D in the state illustrated in FIG. 7B, the aluminum tube member 13 is expanded simultaneously at the axial positions of the support members 43, 45, 47, and 49 by electromagnetic forming.

With the electromagnetic forming device 200 according to the present embodiment, it is possible to electromagnetically form a plurality of desirable tube expansion positions simultaneously by using the third coil unit 30C and the fourth coil unit 30D, in each of which a plurality of electromagnetic-forming coil portions are serially arranged. Thus, man-hours for performing the tube expansion step can be reduced, and the takt time can be reduced. The electromagnetic-forming coil portions 29A, 29B, 29C, and 29D may be energized simultaneously or sequentially. Also in this case, the step can be simplified, because it is not necessary to move the third coil unit 30C and the fourth coil unit 30D.

<Electromagnetic Forming Device According to Third Embodiment>

Next, an electromagnetic forming device for an aluminum tube member according to a third embodiment will be described.

FIGS. 8A and 8B are plan views of the electromagnetic forming device according to the third embodiment, illustrating in a stepwise manner a tube-expansion step performed by using the electromagnetic forming device.

An electromagnetic forming device 300 according to the present embodiment has a configuration such that the tube insertion stage ST1 and the tube expansion stage ST2 of the electromagnetic forming devices 100 and 200 according of the first and second embodiments are integrated. That is, as illustrated in FIG. 8A, at the tube insertion stage ST1, a coil unit 30C in which the first electromagnetic-forming coil portion 29A, the second electromagnetic-forming coil portion 29B, the third electromagnetic-forming coil portion 29C, and the fourth electromagnetic-forming coil portion 29D are arranged so as to be separated from each other, is held in a state of having been inserted into the aluminum tube member 13. The first electromagnetic-forming coil portion 29A, the second electromagnetic-forming coil portion 29B, the third electromagnetic-forming coil portion 29C, and the fourth electromagnetic-forming coil portion 29D are respectively placed so as to correspond to the axial positions of the support members 43, 45, 47, and 49.

As illustrated in FIG. 8B, the tube insertion mechanism 35 moves the aluminum tube member 13 and the third coil unit 30C toward the jig plate 31 while maintaining the positional relationships therebetween. Then, the first electromagnetic-forming coil portion 29A, the second electromagnetic-forming coil portion 29B, the third electromagnetic-forming coil portion 29C, and the fourth electromagnetic-forming coil portion 29D are simultaneously placed at axial positions facing the support members 43, 45, 47, and 49.

That is, the aluminum tube member 13 and the third coil unit 30C are placed in such a way that: the first electromagnetic-forming coil portion 29A is placed at an axial position corresponding to the support member 43, which is a tube expansion position; and, likewise, the second electromagnetic-forming coil portion 29B is placed so as to correspond to the support member 45, the third electromagnetic-forming coil portion 29C is placed so as to correspond to the support member 47, and the fourth electromagnetic-forming coil portion 29D is placed so as to correspond to the support member 49.

With the electromagnetic forming device 300 according to the present embodiment, in a state in which the first, electromagnetic-forming coil portion 29A, the second electromagnetic-forming coil portion 29B, the third electromagnetic-forming coil portion 29C, and the fourth electromagnetic-forming coil portion 29D have been placed in the aluminum tube member 13 beforehand, these are inserted into the support members 43, 45, 47, and 49. Therefore, the tube insertion step and the tube expansion step can be integrated into one step, and the takt time can be reduced.

<Electromagnetic Forming Device According to Fourth Embodiment>

Next, an electromagnetic forming device for an aluminum tube member according to a fourth embodiment will be described.

Figure 9:
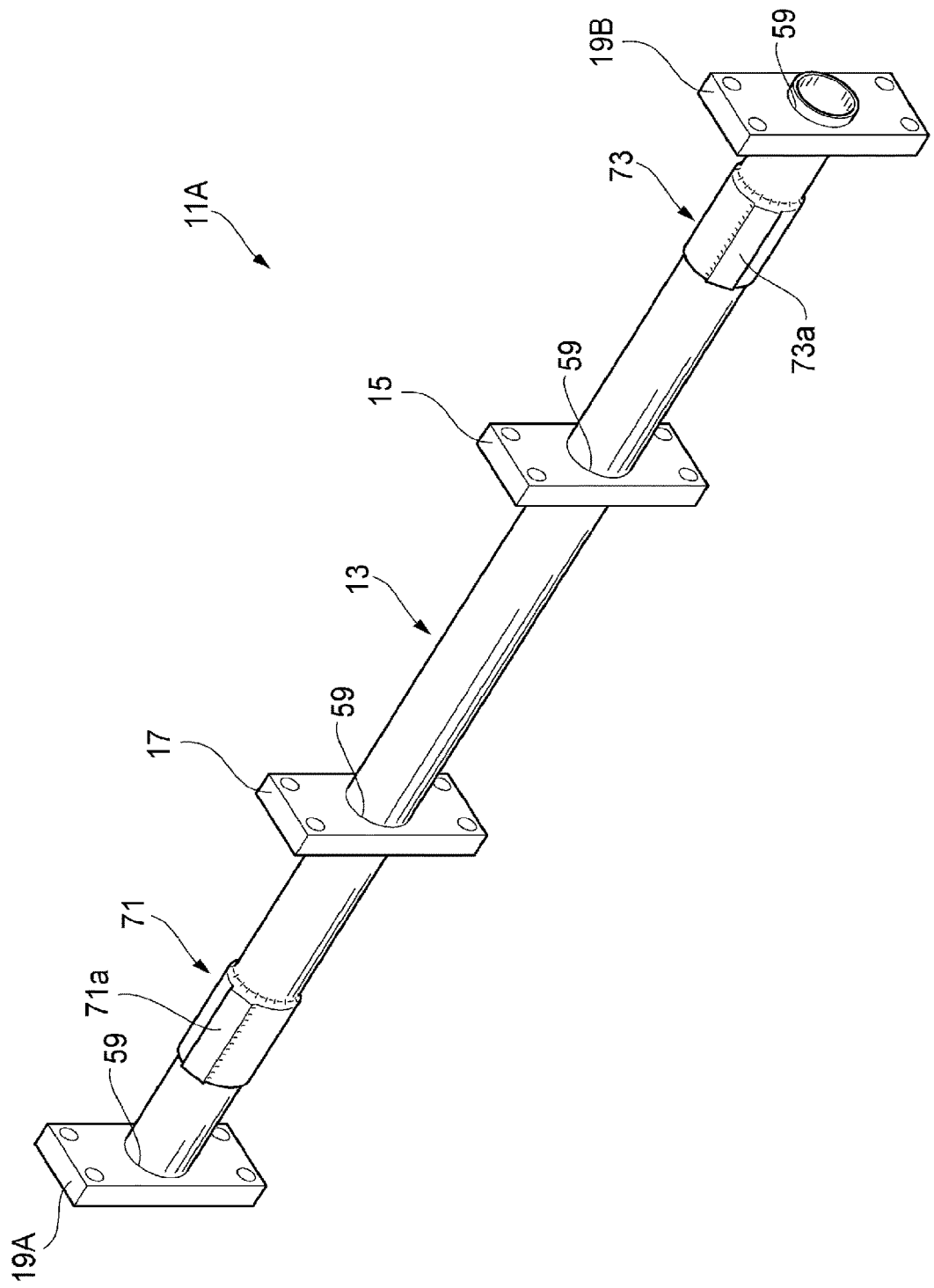
FIG. 9 is an external perspective view schematically illustrating a formed article that is formed by using an electromagnetic forming device according to a fourth embodiment.

FIG. 9 is an external perspective view schematically illustrating a formed article 11A that is formed by using the electromagnetic forming device according to the fourth embodiment.

The formed article 11A has a similar configuration to the formed article 11 illustrated in FIG. 1 except that the aluminum tube member 13 of the formed article 11A has embossed portions 71 and 73, which protrude outward in the radial direction.

The embossed portion 71 is disposed between the bracket 19A and the bracket 17 on the aluminum tube member 13, and the embossed portion 73 is disposed between the bracket 19B and the bracket 15 on the aluminum tube member 13. The embossed portions 71 and 73 respectively have flat attachment surfaces 71a and 73a for attaching other members thereto.

Figure 10:
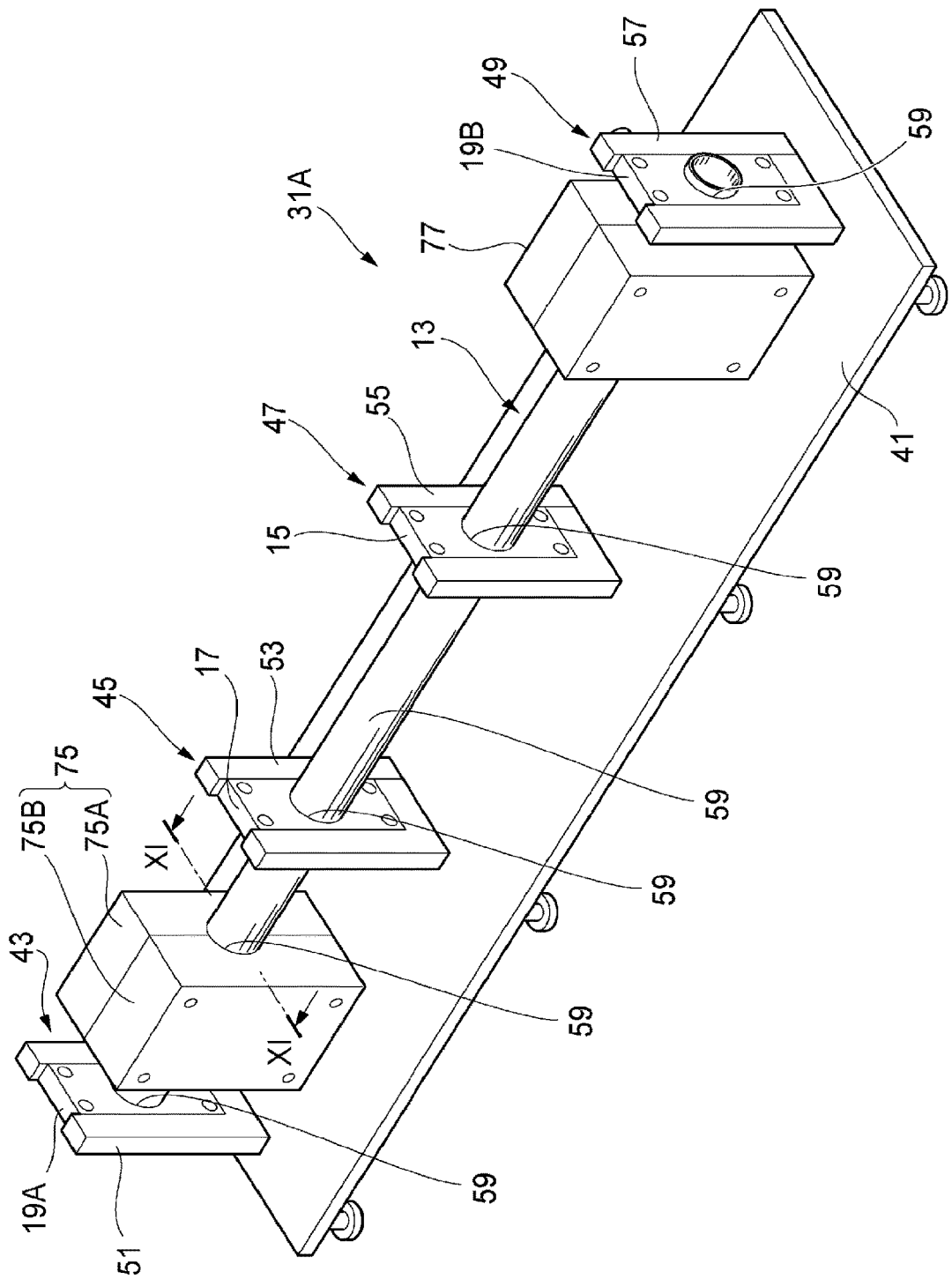
FIG. 10 is a perspective view of a jig plate on which the tube member illustrated in FIG. 9 is supported.

FIG. 10 is a perspective view of a jig plate 31A on which the formed article 11A illustrated in FIG. 9 is supported.

The jig plate 31A according to the present embodiment has a similar configuration to the jig plate 31 illustrated in FIG. 3 except that dies 75 and 77 for forming embossed portions are disposed on the substrate 41. The die 75 is disposed between the support member 43 and the support member 45, and the die 77 is disposed between the support member 47 and the support member 49.

Figure 11A:
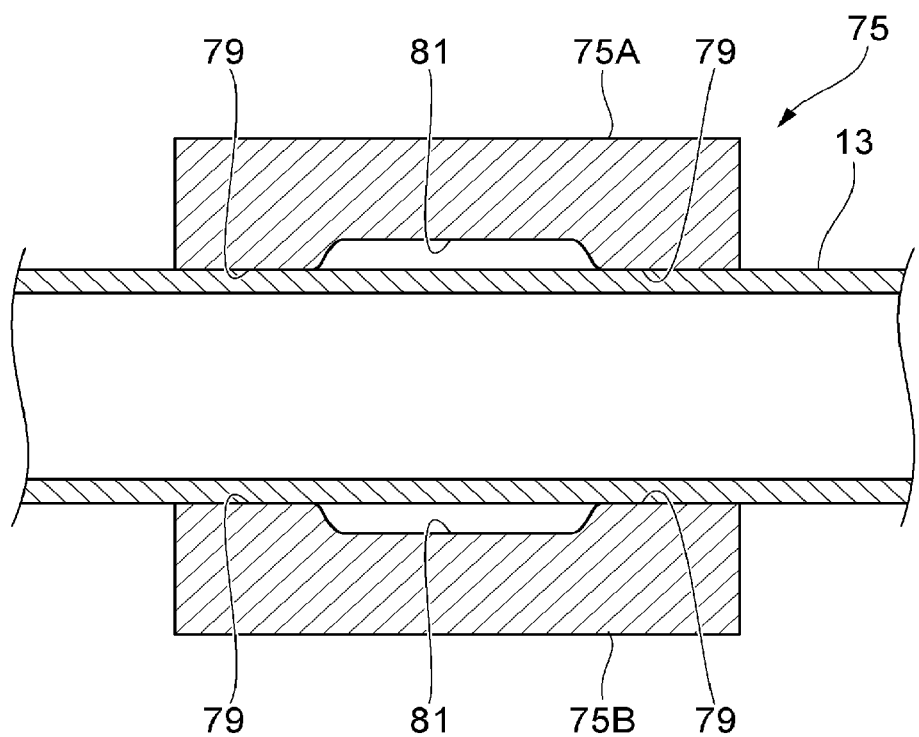
FIG. 11A is a sectional view of a die illustrated in FIG. 10 taken along line XI-XI, illustrating the die and an aluminum tube member before electromagnetic forming.
Figure 11B:
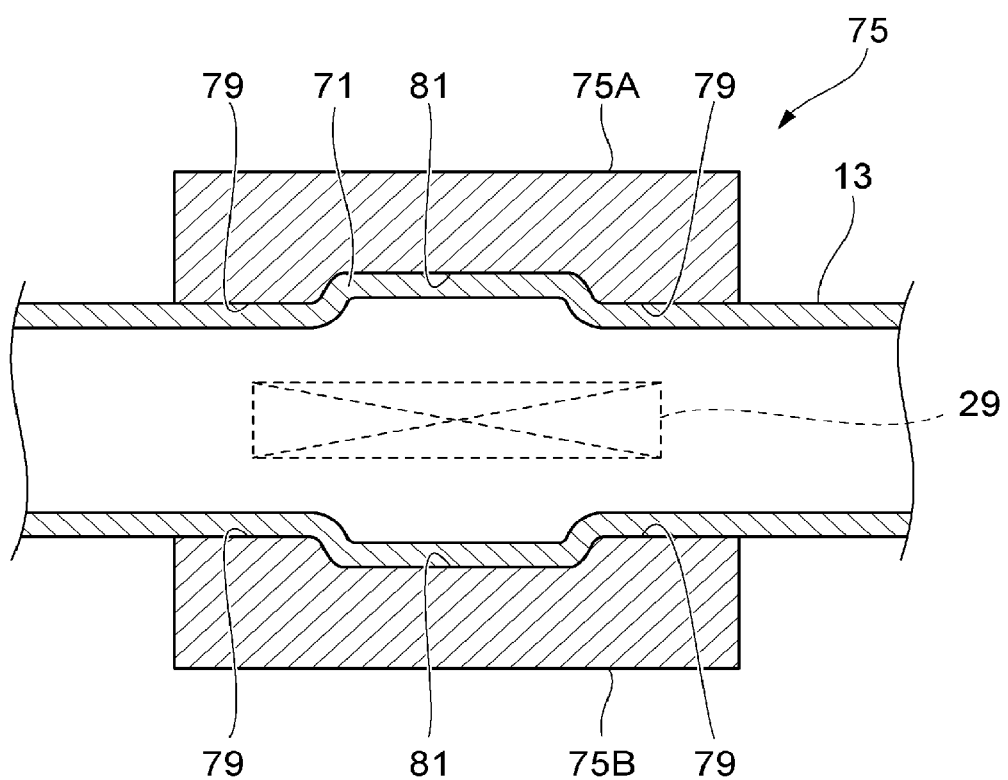
FIG. 11B is a sectional view of the die and the aluminum tube member of FIG. 11A after electromagnetic forming.

FIG. 11A is a sectional view of the die 75 illustrated in FIG. 10 taken along line XI-XI, illustrating the die 75 and the aluminum tube member 13 before electromagnetic forming. FIG. 11B is a sectional view of the die 75 and the aluminum tube member 13 of FIG. 11A after electromagnetic forming.

As illustrated in FIG. 11A, the die 75 is composed of a pair of split-cavity dies 75A and 75B that clamp the aluminum tube member 13 in the radial direction. In inner surfaces of the split-cavity dies 75A and 75B, a cavity is formed of a linear groove 79 that is substantially equal to the outside diameter of the aluminum tube member 13 and an annular groove 81 that is recessed outward in the radial direction at the center of the split-cavity dies 75A and 75B in the axial direction. As illustrated in FIG. 11B, the annular groove 81 transfers a groove shape to the aluminum tube member 13 when electromagnetic forming is performed by energizing an electromagnetic-forming coil portion 29, which is indicated by dotted lines in the figure, to form the embossed portion 71, having the attachment surface 71a (see FIG. 9), on the aluminum tube member 13.

Likewise, the die 77 has a linear groove and an annular groove corresponding to the outside diameter of the aluminum tube member 13, and forms the embossed portion 73, having the attachment surface 73a, on the aluminum tube member 13. Detailed description of the die 77, which has similar configuration and function to FIGS. 11A and 11B, will be omitted here.

Next, the configuration of an electromagnetic forming device that uses the jig plate 31A including the dies 75 and 77 will be described.

Figure 12:
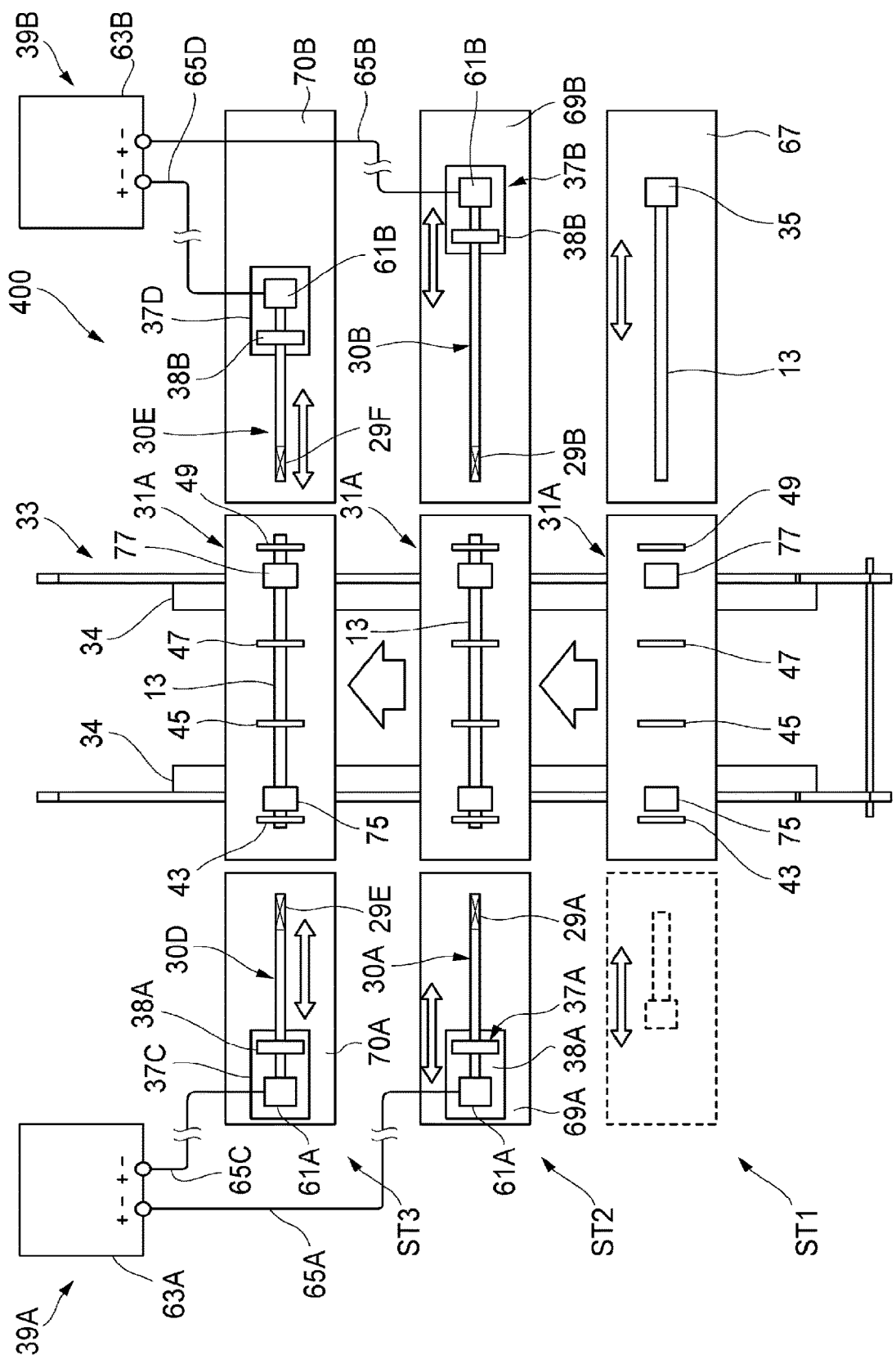
FIG. 12 is a schematic plan view of the electromagnetic forming device for an aluminum tube member according to the fourth embodiment.

FIG. 12 is a schematic plan view of an electromagnetic forming device 400 for an aluminum tube member according to the fourth embodiment.

The electromagnetic forming device 400 according to the present embodiment further includes a tube expansion stage ST3 for forming embossed portions, in addition to the tube insertion stage ST1 and the tube expansion stage ST2 of the electromagnetic forming device 100 illustrated in FIG. 2.

The basic configuration of the tube expansion stage ST3 is similar to that of the tube expansion stage ST2. A third coil movement mechanism 37C, which supports a fourth coil unit 30D, is disposed on a base 70A. A fourth coil movement mechanism 37D, which supports a fifth coil unit 30E, is disposed on a base 70B.

The fourth coil unit 30D includes a fifth electromagnetic-forming coil portion 29E that expands the aluminum tube member 13 at the axial position of the die 75. The fifth coil unit 30E includes a sixth electromagnetic-forming coil portion 29F that expands the aluminum tube member 13 at the axial position of the die 77.

A high-voltage power supply cable 65C, which is connected to an electric power source 63A, is connected to the coil terminal portions 61A of the third coil movement mechanism 37C. A high-voltage power supply cable 65D, which is connected to an electric power source 63B, is connected to the coil terminal portion 61B of the fourth coil movement mechanism 37D.

In the electromagnetic forming device 400, the tube insertion step at the tube insertion stage ST1 and the tube expansion step at the tube expansion stage ST2 are performed, and the jig plate 31A placed at the tube expansion stage ST2 is transported to the tube expansion stage ST3 by the jig plate transport mechanism 33.

The brackets 15, 17, 19A, and 19B (see FIG. 10) are crimped, through the tube expansion step, to the aluminum tube member 13 that is supported by the jig plate 31A transported to the tube expansion stage ST3.

At the tube expansion stage ST3, the fourth coil unit 30D is inserted into the aluminum tube member 13, to which the brackets have been crimped, to place the fifth electromagnetic-forming coil portion 29E, which is at the distal end, at the axial position of the die 75. Moreover, the fifth coil unit 30E is inserted into the aluminum tube member 13, to which the brackets have been crimped, to place the sixth electromagnetic-forming coil portion 29F, which is at the distal end, at the axial position of the die 77. The electric current supply portions 39A and 39B energize the fifth electromagnetic-forming coil portion 29E and the sixth electromagnetic-forming coil portion 29F to electromagnetically form the embossed portions 71 and 73 illustrated in FIG. 10 on the aluminum tube member 13.

In the example described above, the electromagnetic forming device 400 includes the tube insertion stage ST1 and the two tube expansion stages ST2 and ST3. As necessary, the electromagnetic forming device 400 may include still another processing stage.

With the electromagnetic forming device 400, which includes the plurality of tube expansion stages, it is possible to perform the tube expansion step a plurality of times and to electromagnetically form the aluminum tube member 13 into a more complex shape. Compared with a case where processing is performed at only one tube expansion stage, the arrangement of electromagnetic-forming coil portions and movement of the electromagnetic-forming coil portions in the tube member do not become complicated, and it is possible to simultaneously perform electromagnetic forming at a plurality of tube expansion stages. Thus, the takt time can be further reduced, and electromagnetic forming can be performed with higher efficiency.

By disposing the electromagnetic-forming coil portion at each of the plurality of tube expansion stages, it is possible to perform different processing operations at the stages, such as crimp joining at the first tube expansion stage ST2 and embossing at the second tube expansion stage ST3. Alternatively, for example, tube expansion may be performed at the first stage; and, at the second, third, or another stage, forming of flat protruding portions on the aluminum tube member, beading, embossing, drilling, burring, or the like may be performed. As described above, with the electromagnetic forming device 400 according to the present embodiment, in addition to electromagnetic forming, various combinations of multiple processing operations can be easily performed, and the electromagnetic forming device 400 can be made highly versatile.

As shown by dotted lines in the figure, the electromagnetic forming device 400 according to the present embodiment also may have a configuration such that aluminum tube members are set on the jig plate 31 at the tube insertion stage ST1 by moving the aluminum tube members from both sides in the axial direction of the jig plate 31.

Figure 13A:
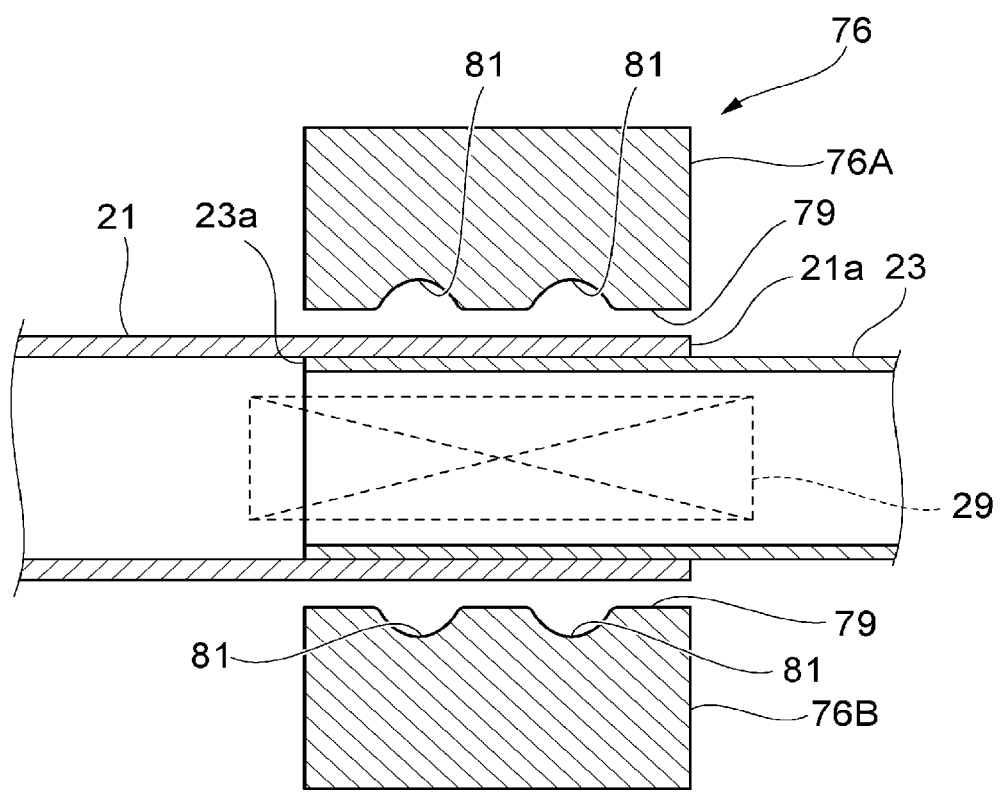
FIG. 13A is a sectional view illustrating a state in which a large-diameter tube member and a small-diameter tube member are set in a die before electromagnetic forming.
Figure 13B:
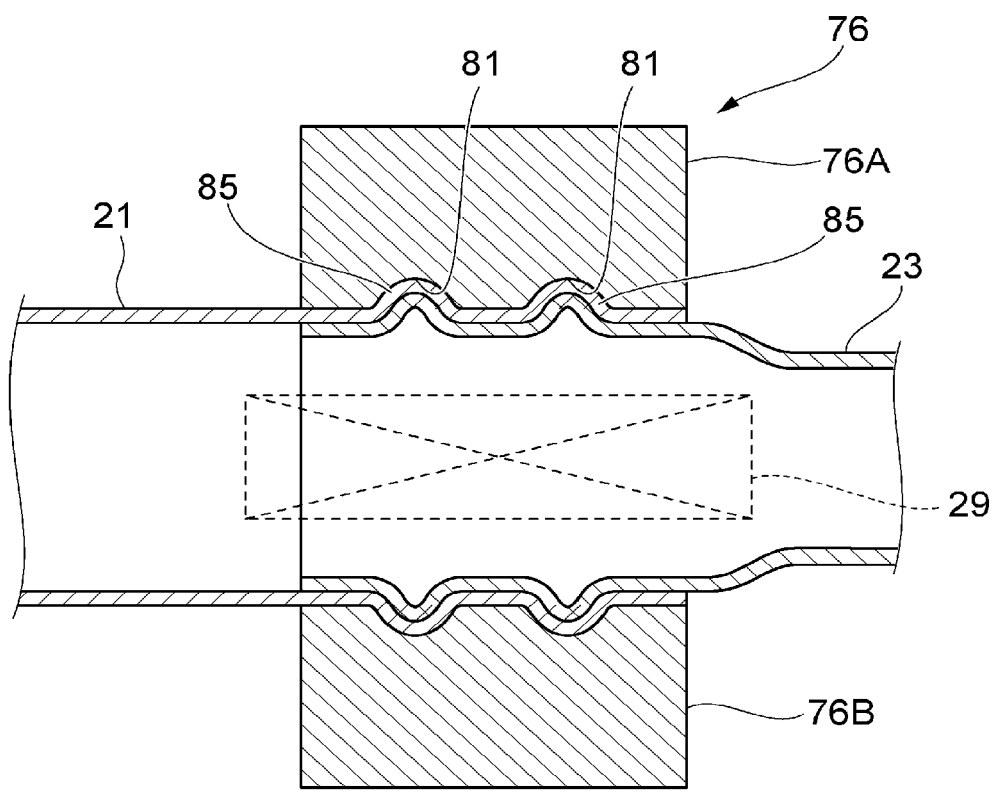
FIG. 13B is a sectional view illustrating a state of FIG. 13A after electromagnetic forming.

FIG. 13A is a sectional view illustrating a state in which a large-diameter tube member and a small-diameter tube member are set in a die before electromagnetic forming. FIG. 13B is a sectional view illustrating a state of FIG. 13A after electromagnetic forming.

As illustrated in FIG. 13A, the aluminum tube member in this case is composed of a small-diameter tube member (first tube member) 23 and a large-diameter tube member (second tube member) 21, which has a larger inside diameter than the small-diameter tube member 23. A tube end portion 23a of the small-diameter tube member 23 is inserted into a tube end portion 21a of the large-diameter tube member 21 to form an overlapping portion where the end portions of the tube members overlap in the radial direction. A die 76 is placed on the outside of the overlapping portion.

The die 76 is composed of a pair of split-cavity dies 76A and 76B, and a linear groove 79 and annular grooves 81 are formed in die surfaces thereof facing the large-diameter tube member 21. The electromagnetic-forming coil portion 29 is placed in the small-diameter tube member 23 at the overlapping portion.

As illustrated in FIG. 13B, the small-diameter tube member 23 is expanded when the electromagnetic-forming coil portion 29 is energized. Due to the expansion of the small-diameter tube member 23, the large-diameter tube member 21 on the outside is also expanded. As a result, the overlapping portion of the large-diameter tube member 21 and the small-diameter tube member 23 is pressed against the linear groove 79 and the annular grooves 81 of the split-cavity dies 76A and 76B, and annular protrusions 85 are formed by the annular groove 81. At the protrusions 85, the large-diameter tube member 21 and the small-diameter tube member 23 are crimped to each other and firmly joined to each other. Here, preferably, the coil length of the electromagnetic-forming coil portion 29 (the length in the axial direction of a portion where a lead wire is wound) is larger than the length of each of the split-cavity dies 76A and 76B, which serve as pressing portions during tube expansion, in the tube axial direction and the length of the overlapping portion of the large-diameter tube member 21 and the small-diameter tube member 23.

An aluminum tube member that is electromagnetically formed may have a configuration such that three or more tube members are joined to each other, instead of a configuration such that two tube members, which are a large-diameter tube member and a small-diameter tube member, are joined to each other.

<Modifications>

The transport direction in which the jig plate transport mechanism 33 transports the jig plate 31 (and 31A) is not limited to the one direction described above.

FIGS. 14A to 14E each schematically illustrate a transport mode in which the jig plate transport mechanism 33 transports the jig plates 31. The number and arrangement of the jig plates (processing stages) are examples and are not limited to these.

Figure 14A:
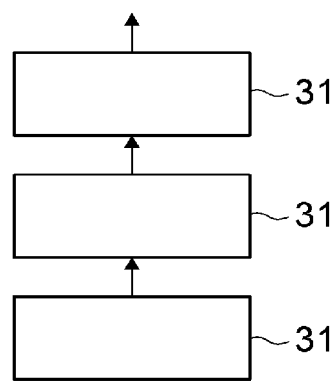
FIG. 14A schematically illustrates a transport mode in which a jig plate transport mechanism transports a jig plate.
Figure 14B:
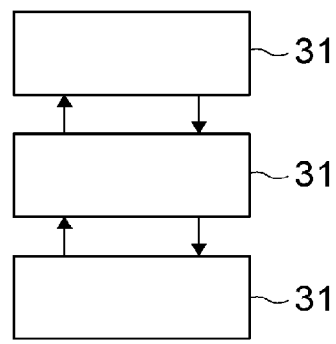
FIG. 14B schematically illustrates a transport mode in which the jig plate transport mechanism transports the jig plate.

As illustrated in FIG. 14A, the transport direction of the jig plate 31 may be one direction from a tube insertion stage to a tube expansion stage, or may be reciprocating movement as illustrated in FIG. 14B.

Figure 14C:
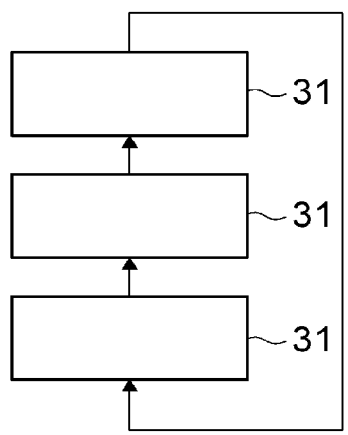
FIG. 14C schematically illustrates a transport mode in which the jig plate transport mechanism transports the jig plate.

As illustrated in FIG. 14C, the transport mode may be such that the jig plate 31 that has reached the distal end in one direction is returned to the starting end. For example, a circulating member in which a chain, a toothed belt, or the like is looped in an endless shape over wheels, such as sprockets, is formed; and the jig plate 31 is attached to the circulating member. With this configuration, continuous processing can be performed by using one side (for example, the upper side) of the circulating member as a processing transport path along which processing stages are disposed and using the other side (for example, the lower side) as a return transport path for the jig plate 31.

Figure 14D:
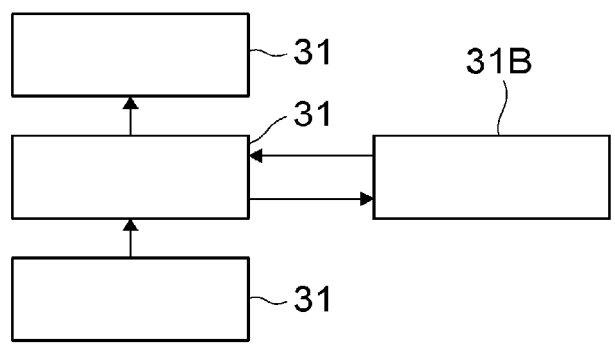
FIG. 14D schematically illustrates a transport mode in which the jig plate transport mechanism transports the jig plate.

As illustrated in FIG. 14D, the transport mode may have a sub-transport path along which the jig plate 31 is transported from a part of a main transport path illustrated in FIG. 14A in a direction that intersects the transport direction of the main transport path. In this case, another processing step, an inspection step, and the like can be easily performed additionally on a jig plate 31B diverged to the sub-transport path.

Figure 14E:
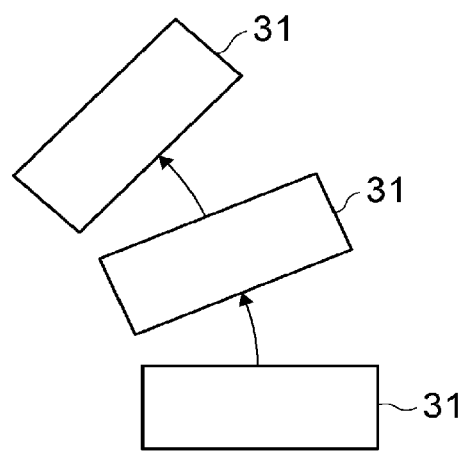
FIG. 14E schematically illustrates a transport mode in which the jig plate transport mechanism transports the jig plate.

As illustrated in FIG. 14E, the transport direction of the jig plate 31 is not limited to a direction along a straight line, and may be a direction along an arc. As in this example, the transport mode may be such that the jig plate 31 is transported in horizontal two-axis directions, or in three-axis directions additionally including the up-down direction. In this case, compared with a case where the jig plate 31 is transported along a straight line, the space efficiency in setting the device is increased. Thus, it is possible to save not only space for the electromagnetic forming device but also space for a transport path for supplying materials to the electromagnetic forming device and space for a transport path for taking out, products after forming. The transport modes described above may be used in appropriate combinations as necessary.

Thus, the present invention is not limited to the embodiments described above. The present invention anticipates and includes, in the scope thereof, appropriate combinations of the configurations of the embodiments and modifications and applications that can be made by a person having ordinary skill in the art based on the present description and known technologies.

For example, instead of inserting the tube member into the through holes of the support members by moving the tube member toward the jig plate, the tube member may be inserted into the through holes by moving the jig plate toward the tube member. Instead of inserting the coil unit into the tube member by moving the coil unit, the coil unit maybe inserted into the tube member by moving the tube member. That is, movement of portions may be relative movement such that one of the portions moves relative to the other.

The present application is based on Japanese Patent Application 2017-136635 filed on Jul. 12, 2017, the entire contents of which are incorporated herein by reference.

REFERENCE SIGNS LIST

13 aluminum tube member (tube member)
21 large-diameter tube member (second tube member)
21a tube end portion
23 small-diameter tube member (first tube member)
23a tube end portion
29 electromagnetic-forming coil portion
29A first electromagnetic-forming coil portion
29B second electromagnetic-forming coil portion
29C third electromagnetic-forming coil portion
29D fourth electromagnetic-forming coil portion
29E fifth electromagnetic-forming coil portion
29F sixth electromagnetic-forming coil portion
30A first coil unit
30B second coil unit
31, 31A, 31B jig plate
33 jig plate transport mechanism
35 tube insertion mechanism
37A first, coil movement, mechanism
37B second coil movement mechanism
37C third coil movement mechanism
37D fourth coil movement mechanism
39A, 39B electric current supply portion
41 substrate
43, 45, 47, 49 support member
51, 53, 55, 57 bracket holder
59 through hole
100, 200, 300, 400 electromagnetic forming device
ST1 tube insertion stage
ST2, ST3 tube expansion stage

The invention claimed is:

1. An electromagnetic forming device for an aluminum tube member, comprising:
   a jig plate in which at least one support member having a through hole is fixed onto a substrate;
   a tube insertion mechanism that moves a tube member made of an aluminum alloy and the jig plate relative to each other in an axial direction to insert the tube member into the through hole of the support member;
   a coil unit including at least one electromagnetic-forming coil portion;
   a coil movement mechanism that moves the coil unit in the tube member relative to the tube member in the axial direction to place the electromagnetic-forming coil portion at a tube expansion position of the tube member;
   an electric current supply portion that supplies an electric current for electromagnetic forming to the electromagnetic-forming coil portion; and
   a jig plate transport mechanism that transports the jig plate from a tube insertion stage to a tube expansion stage, the tube insertion stage being a stage where the tube insertion mechanism inserts the tube member into the through hole, the tube expansion stage being a stage where the coil movement mechanism places the electromagnetic-forming coil portion at the tube expansion position of the tube member.

2. The electromagnetic forming device for an aluminum tube member according to claim 1, wherein the tube member includes a first tube member and a second tube member that are disposed coaxially with each other, the second tube member having an inside diameter larger than an outside diameter of the first tube member, and
   wherein an overlapping portion where end portions of the first tube member and the second tube member overlap in a radial direction is formed at the tube expansion position.

3. The electromagnetic forming device for an aluminum tube member according to claim 1, wherein, in the coil unit, the electromagnetic-forming coil portion is disposed at each of a plurality of positions arranged in the axial direction.

4. The electromagnetic forming device for an aluminum tube member according to claim 2, wherein, in the coil unit, the electromagnetic-forming coil portion is disposed at each of a plurality of positions arranged in the axial direction.

5. The electromagnetic forming device for an aluminum tube member according to claim 1, wherein, in the jig plate, a plurality of the support members are fixed onto the substrate so as to be arranged in the axial direction.

6. The electromagnetic forming device for an aluminum tube member according to claim 2, wherein, in the jig plate, a plurality of the support members are fixed onto the substrate so as to be arranged in the axial direction.

7. The electromagnetic forming device for an aluminum tube member according to claim 3, wherein, in the jig plate, a plurality of the support members are fixed onto the substrate so as to be arranged in the axial direction.

8. The electromagnetic forming device for an aluminum tube member according to claim 4, wherein, in the jig plate, a plurality of the support members are fixed onto the substrate so as to be arranged in the axial direction.

9. The electromagnetic forming device for an aluminum tube member according to claim 1,
wherein the coil unit includes a first coil unit that is inserted from one end side of the tube member and a second coil unit that is inserted from the other end side of the tube member, and
wherein the coil movement mechanism includes a first coil movement mechanism that moves the first coil unit along an axis of the tube member and a second coil movement mechanism that moves the second coil unit along the axis.

10. The electromagnetic forming device for an aluminum tube member according to claim 1, wherein the tube expansion stage is provided at each of a plurality of positions arranged in a transport direction of the jig plate, and the electromagnetic-forming coil portion and the coil movement mechanism are provided at each of the tube expansion stages.

11. The electromagnetic forming device for an aluminum tube member according to claim 9, wherein the tube expansion stage is provided at each of a plurality of positions arranged in a transport direction of the jig plate, and the electromagnetic-forming coil portion and the coil movement mechanism are provided at each of the tube expansion stages.

12. The electromagnetic forming device for an aluminum tube member according to claim 1, wherein the jig plate transport mechanism transports the jig plate while the tube member is continued to be inserted in the through hole of the support member.

13. The electromagnetic forming device for an aluminum tube member according to claim 9, wherein the jig plate transport mechanism transports the jig plate while the tube member is continued to be inserted in the through hole of the support member.

14. The electromagnetic forming device for an aluminum tube member according to claim 10, wherein the jig plate transport mechanism transports the jig plate while the tube member is continued to be inserted in the through hole of the support member.

15. An electromagnetic forming method for an aluminum tube member, the method comprising the following steps that are performed in sequence:
a tube insertion step of moving a jig plate in which at least one support member having a through hole is fixed onto a substrate and a tube member made of an aluminum alloy relative to each other to insert the tube member into the through hole of the support member;
a step of transporting the jig plate on which the tube member is supported to a next stage;
a coil placement step of moving a coil unit including at least one electromagnetic-forming coil portion and the tube member relative to each other in the tube member to place the electromagnetic-forming coil portion at a tube expansion position of the tube member; and
a tube expansion step of supplying an electric current for electromagnetic forming to the electromagnetic-forming coil portion to expand the tube member.

16. The electromagnetic forming method for an aluminum tube member according to claim 15, comprising a step of transporting, to a next processing stage, the jig plate on which the tube member that has been expanded is supported.

17. The electromagnetic forming method for an aluminum tube member according to claim 15, wherein the coil placement step and the tube expansion step are sequentially performed at each of a plurality of the tube expansion positions of the tube member.

18. The electromagnetic forming method for an aluminum tube member according to claim 16, wherein the coil placement step and the tube expansion step are sequentially performed at each of a plurality of the tube expansion positions of the tube member.

19. The electromagnetic forming method for an aluminum tube member according to claim 15, wherein the electromagnetic-forming coil portion is placed at each of a plurality of the tube expansion positions of the tube member to simultaneously expand the plurality of tube expansion positions of the tube member.

20. An electromagnetic forming method for an aluminum tube member, the method comprising the following steps that are performed in sequence:
a step of moving
a tube member made of an aluminum alloy and a coil unit including at least one electromagnetic-forming coil portion, the coil unit having been inserted into the tube member so that the electromagnetic-forming coil portion is placed at a tube expansion position of the tube member, and
a jig plate in which at least one supporting member having a through hole is fixed onto a substrate,
relative to each other while maintaining a positional relationship between the electromagnetic-forming coil portion and the tube expansion position to insert the tube member into the through hole of the support member; and
a tube expansion step of expanding the tube member by supplying an electric current for electromagnetic forming to the electromagnetic-forming coil portion.

* * * * *